(12) United States Patent
Togashi et al.

(10) Patent No.: US 10,013,079 B2
(45) Date of Patent: Jul. 3, 2018

(54) DISPLAY DEVICE AND TOUCH DETECTION SYSTEM

(71) Applicant: Japan Display Inc., Tokyo (JP)

(72) Inventors: Masahiro Togashi, Tokyo (JP); Michio Yamamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 209 days.

(21) Appl. No.: 15/098,882

(22) Filed: Apr. 14, 2016

(65) Prior Publication Data

US 2016/0306492 A1 Oct. 20, 2016

(30) Foreign Application Priority Data

Apr. 15, 2015 (JP) ................................. 2015-083767

(51) Int. Cl.
*G06F 3/041* (2006.01)
*G06F 3/033* (2013.01)
*G06F 3/044* (2006.01)
*G06F 3/0354* (2013.01)

(52) U.S. Cl.
CPC .......... *G06F 3/033* (2013.01); *G06F 3/03545* (2013.01); *G06F 3/044* (2013.01); *G06F 3/0412* (2013.01); *G06F 3/0418* (2013.01)

(58) Field of Classification Search
CPC ............ G06F 3/041; G06F 3/045; G06F 3/02; G09G 5/00
See application file for complete search history.

(56) References Cited

U.S. PATENT DOCUMENTS

| | | | | |
|---|---|---|---|---|
| 2013/0113762 A1* | 5/2013 | Geaghan | ................. | G06F 3/044 345/179 |
| 2014/0168173 A1* | 6/2014 | Idzik | ..................... | G06F 3/0304 345/179 |
| 2016/0048221 A1* | 2/2016 | Boulanger | ............ | G06F 3/0321 345/594 |

FOREIGN PATENT DOCUMENTS

| | | |
|---|---|---|
| JP | 2004-086488 | 3/2004 |
| JP | 2010-218175 | 9/2010 |

* cited by examiner

*Primary Examiner* — Pegeman Karimi
(74) *Attorney, Agent, or Firm* — K&L Gates LLP

(57) ABSTRACT

According to an aspect, a display device includes: a display unit that displays an image; a touch detection unit that detects an instruction input provided by a pointing device to a display surface of the display unit; an acquisition unit that acquires information indicating a display color at an instruction input position, the display color being detected by a color sensor included in the pointing device; and a determination unit that performs determination processing to determine the instruction input position based on a color of the image and the color indicated by the information acquired by the acquisition unit.

12 Claims, 32 Drawing Sheets

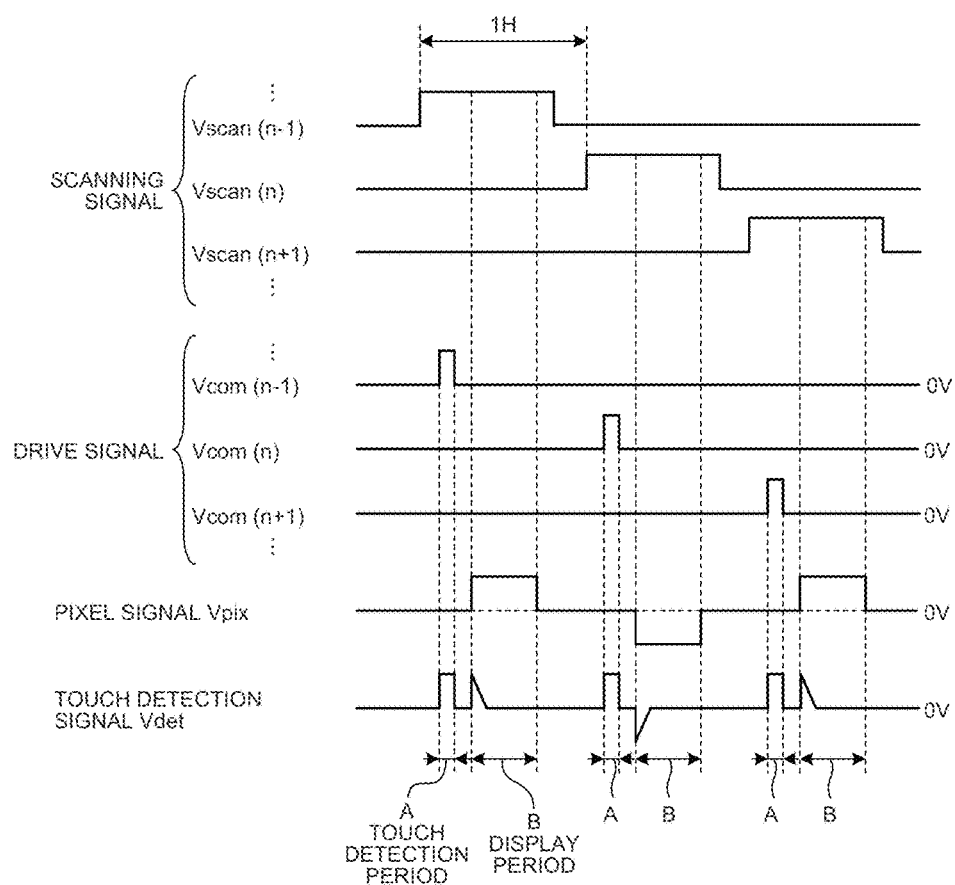
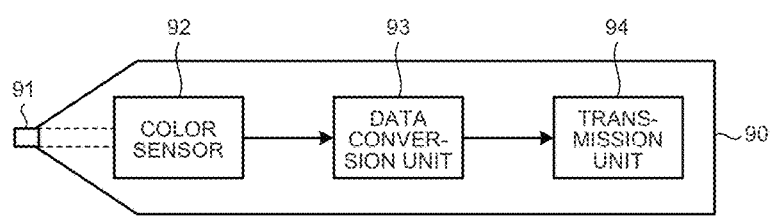

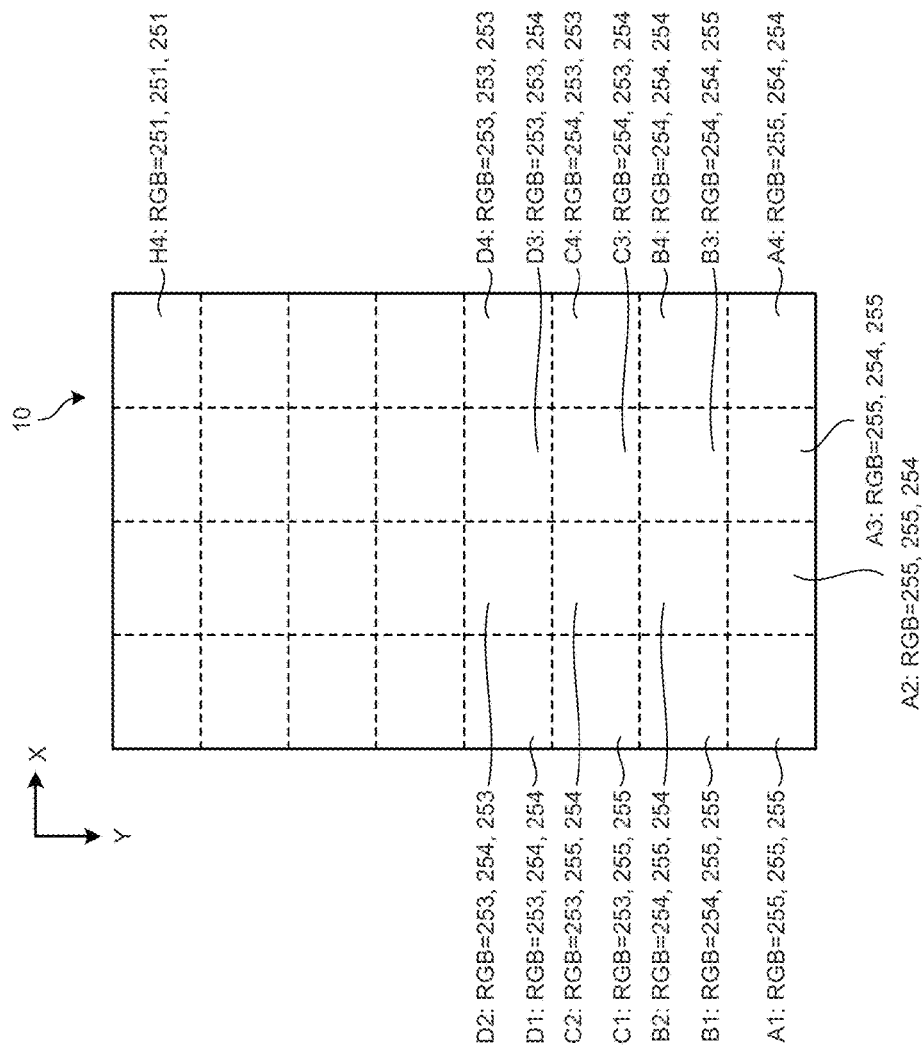

FIG.16

|    | R   | G   | B   |
|----|-----|-----|-----|
| A1 | 255 | 255 | 255 |
| B1 | 254 | 255 | 255 |
| C1 | 253 | 255 | 255 |
| D1 | 253 | 254 | 254 |
| ⋮  | ⋮   | ⋮   | ⋮   |
| A2 | 255 | 255 | 254 |
| B2 | 254 | 255 | 254 |
| C2 | 253 | 255 | 254 |
| D2 | 253 | 254 | 253 |
| ⋮  | ⋮   | ⋮   | ⋮   |
| A3 | 255 | 254 | 255 |
| B3 | 254 | 254 | 255 |
| C3 | 254 | 253 | 254 |
| D3 | 253 | 253 | 254 |
| ⋮  | ⋮   | ⋮   | ⋮   |
| A4 | 255 | 254 | 254 |
| B4 | 254 | 254 | 254 |
| C4 | 254 | 253 | 253 |
| D4 | 253 | 253 | 253 |
| ⋮  | ⋮   | ⋮   | ⋮   |

FIG.24

|  | BEFORE SELECTION | | | AFTER SELECTION | | |
|---|---|---|---|---|---|---|
|  | R | G | B | R | G | B |
| B1 | 254 | 255 | 255 | 1 | 0 | 0 |
| C1 | 253 | 255 | 255 | 2 | 0 | 0 |
| D1 | 253 | 254 | 254 | 2 | 1 | 1 |
| E1 | 252 | 254 | 254 | 3 | 1 | 1 |
| F1 | 252 | 253 | 253 | 3 | 2 | 2 |
| G1 | 251 | 253 | 253 | 4 | 2 | 2 |

FIG.26

|    | BRIGHTNESS OF SCREEN ||||||
|    | BRIGHTNESS 1 ||| BRIGHTNESS 2 |||
|    | R | G | B | R | G | B |
| --- | --- | --- | --- | --- | --- | --- |
| A1 | 255 | 398 | 275 | 962 | 1549 | 1112 |
| A2 | 255 | 398 | 273 | 962 | 1549 | 1093 |
| A3 | 255 | 391 | 275 | 962 | 1541 | 1112 |
| A4 | 255 | 391 | 273 | 962 | 1541 | 1093 |
| ⋮ | ⋮ | ⋮ | ⋮ | ⋮ | ⋮ | ⋮ |

FIG.34

|  | BRIGHTNESS OF SCREEN | | | | | |
|---|---|---|---|---|---|---|
|  | UPPER LIMIT OF GRADATION VALUE | | | LOWER LIMIT OF GRADATION VALUE | | |
|  | R | G | B | R | G | B |
| A1 | 255 | 255 | 255 | 255 | 255 | 255 |
| A2 | 255 | 255 | 255 | 253 | 255 | 255 |
| A3 | 255 | 255 | 255 | 255 | 253 | 255 |
| A4 | 255 | 255 | 255 | 255 | 255 | 253 |
| B1 | 255 | 255 | 255 | 253 | 253 | 255 |
| ⋮ | ⋮ | ⋮ | ⋮ | ⋮ | ⋮ | ⋮ |

DISPLAY DEVICE AND TOUCH DETECTION SYSTEM

CROSS-REFERENCE TO RELATED APPLICATIONS

This application claims priority from Japanese Application No. 2015-083767, filed on Apr. 15, 2015, the contents of which are incorporated by reference herein in its entirety.

BACKGROUND

1. Technical Field

The present invention relates to a display device and a touch detection system.

2. Description of the Related Art

Touch-panel type display devices have been known that can be used for input operation depending on display content. In the input operation, a user inputs an instruction by placing a touch instruction device (hereinafter, referred to as a pointing device) on a display surface on which an image is displayed.

Unfortunately, a touch-panel type display device disclosed in Japanese Patent Application Laid-open Publication No. 2010-218175 may erroneously detect proximity or contact of an object other than the pointing device with respect to a display surface. A specific example of the above is when a user uses one hand to input an instruction with a pointing device via the display surface and the user's other hand accidentally touches the display surface, then a touch is erroneously detected. Another example is when a part of user's one hand is placed on the display surface in the same manner that the user writes characters on a sheet surface with the pointing device, a touch may be erroneously detected at a position where the one hand holding the pointing device is in contact with the display surface.

For the foregoing reasons, there is a need for a display device and a touch detection system that can reduce erroneous detection. Alternatively, there is a need for a display device and a touch detection system that can detect an instruction input from a pointing device more securely.

SUMMARY

According to an aspect, a display device includes: a display unit that displays an image; a touch detection unit that detects an instruction input provided by a pointing device to a display surface of the display unit; an acquisition unit that acquires information indicating a display color at an instruction input position, the display color being detected by a color sensor included in the pointing device; and a determination unit that performs determination processing to determine the instruction input position based on a color of the image and the color indicated by the information acquired by the acquisition unit.

According to another aspect, a touch detection system includes: a display device including a display unit that displays an image and a touch detection unit that detects an instruction input provided to a display surface of the display unit; and a pointing device that provides the instruction input to the display surface. The pointing device includes: a color sensor that detects a display color of the display surface at an instruction input position; and a transmission unit that transmits information indicating the display color at the instruction input position detected by the color sensor. The display device includes: an acquisition unit that acquires the information indicating the display color transmitted by the transmission unit; and a determination unit that determines the instruction input position based on the color of the image and the color indicated by the information acquired by the acquisition unit.

BRIEF DESCRIPTION OF THE DRAWINGS

FIG. 13 is a timing waveform chart illustrating an operation example of the display device according to the embodiment of the present invention;

FIG. 14 is a diagram illustrating a main configuration of the pointing device;

FIG. 15 is a schematic diagram illustrating a relation between partial regions and colors of images;

FIG. 16 is a diagram illustrating an example of the color for each partial region;

FIG. 24 is a diagram illustrating an example of a correspondence relation between colors before and after selecting a radio button and a checkbox;

FIG. 26 is a diagram illustrating an example of a relation between brightness of a screen and a detection result of a display color obtained by a color sensor;

FIG. 34 is a diagram illustrating an example in which the difference in color change for each partial region is represented by a numerical value;

DETAILED DESCRIPTION

Figure 1:
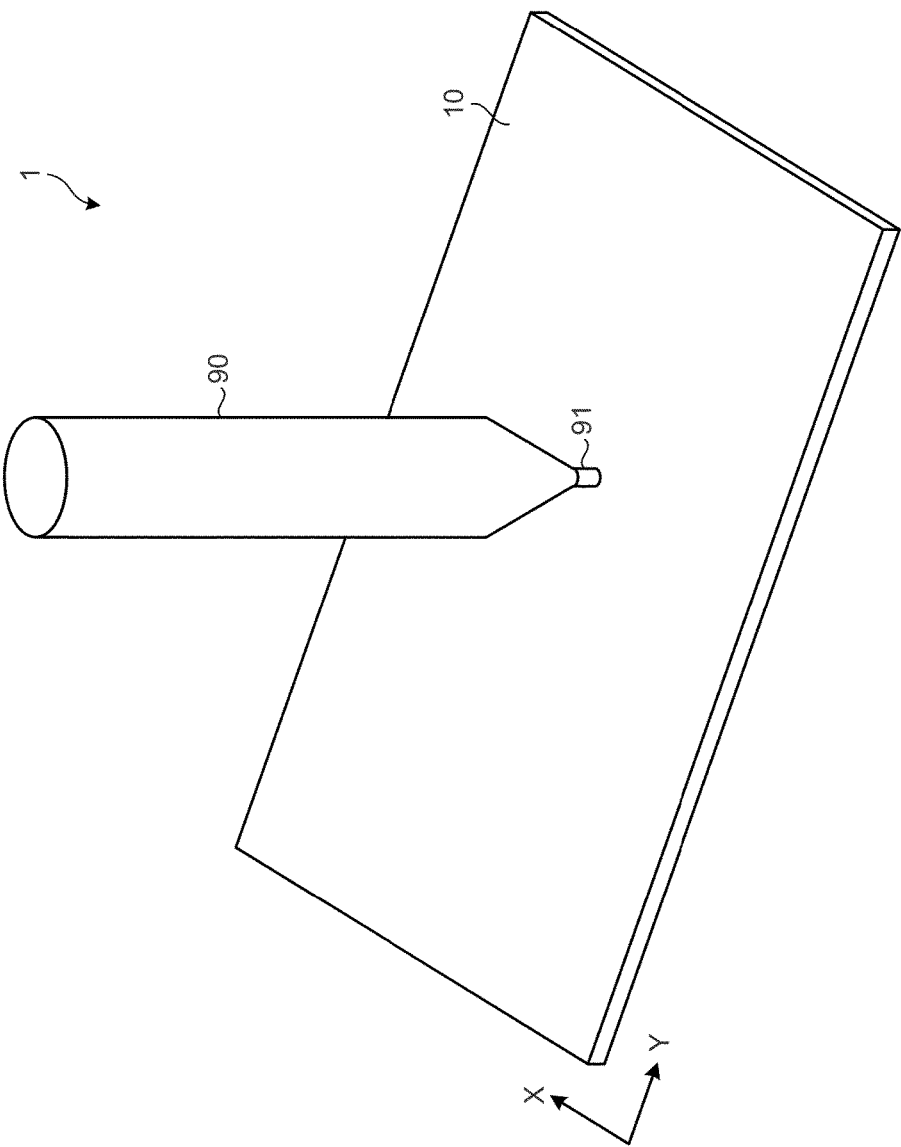
FIG. 1 is a perspective view illustrating an example of a touch detection system according to an embodiment of the present invention.

The following describes embodiments of the present invention with reference to the drawings. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

FIG. 1 is a perspective view illustrating an example of a touch detection system 1 according to an embodiment of the present invention. The touch detection system 1 includes a display device and a pointing device. The display device includes a display unit 20 that displays an image and a touch detection unit 30 that detects an instruction input to a display surface of the display unit 20. The display device is, for example, a display device 10 with a touch detection function according to the embodiment. The pointing device is a device for providing the instruction input to the display surface. The pointing device is, for example, a pointing device 90 according to the embodiment.

Figure 2:
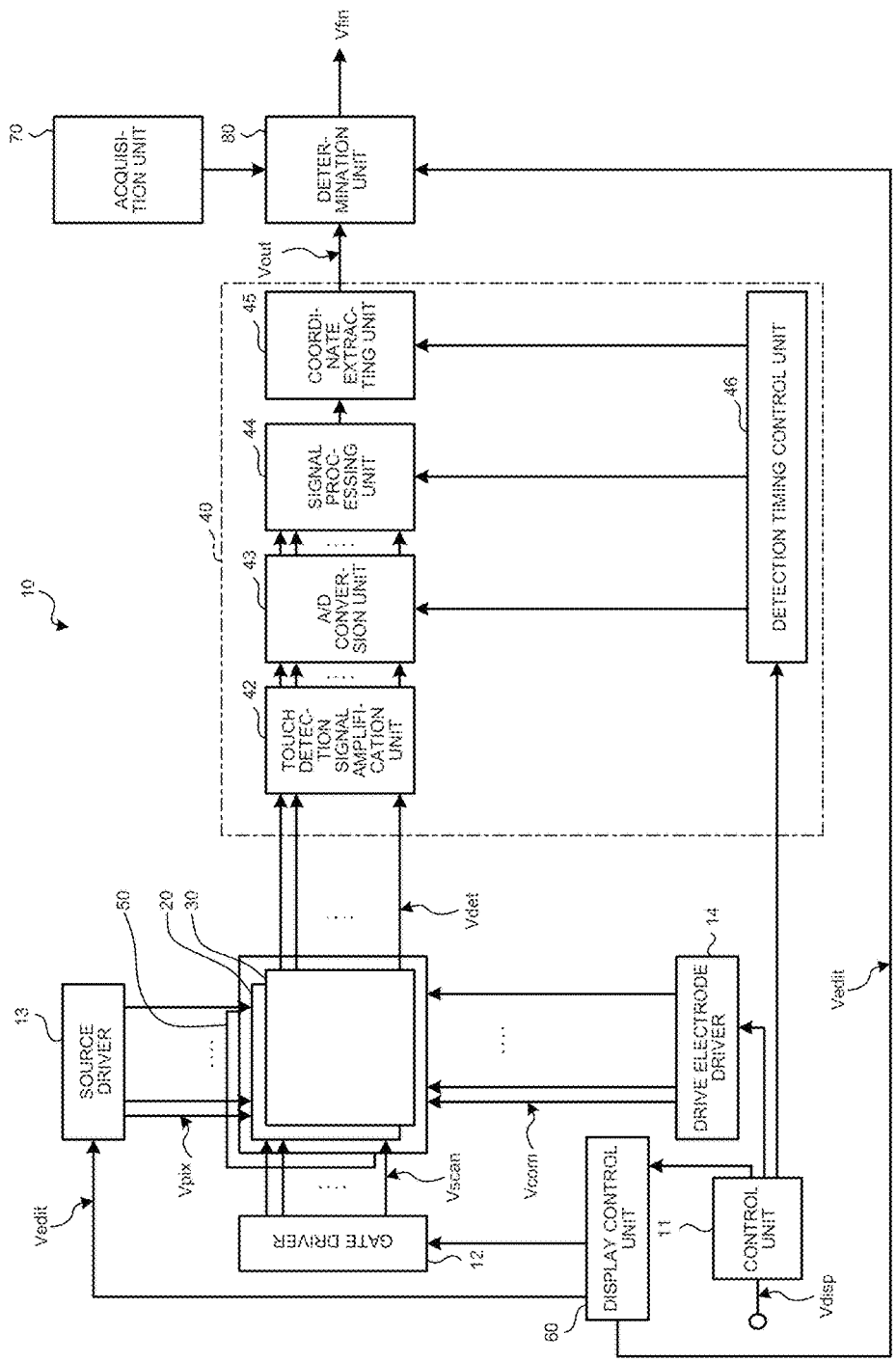
FIG. 2 is a block diagram illustrating a configuration example of a display device according to the embodiment of the present invention.

First, the following describes the display device 10 with a touch detection function. FIG. 2 is a block diagram illustrating a configuration example of the display device 10 with a touch detection function according to the embodiment of the present invention. The display device 10 with a touch detection function includes a control unit 11, a gate driver 12, a source driver 13, a drive electrode driver 14, the display unit 20, the touch detection unit 30, a detection unit 40, a light source device 50, a display control unit 60, an acquisition unit 70, and a determination unit 80. The display device 10 with a touch detection function is a display device including a touch detection function. The display device 10 with a touch detection function is a device integrating the display unit 20 and the touch detection unit 30. The display unit 20 includes a transmissive liquid crystal display element as a display element. The touch detection unit 30 has an electrostatic capacitance type touch detection function. The display device 10 with a touch detection function may be a device in which the electrostatic capacitance type touch detection unit 30 is mounted on the display unit 20. The display unit 20 may be, for example, an organic EL display device.

As described later, the display unit 20 is a device that performs display by sequentially scanning each horizontal line in accordance with a scanning signal Vscan supplied from the gate driver 12. The control unit 11 is a circuit that supplies a control signal to each of the gate driver 12, the source driver 13, the drive electrode driver 14, the detection unit 40, and the display control unit 60 based on a video signal Vdisp supplied from the outside, and performs control so that the components operate in synchronization with each other.

The gate driver 12 has a function of sequentially selecting a horizontal line as a display driving target of the display device 10 with a touch detection function based on the control signal supplied from the control unit 11.

The source driver 13 is a circuit that supplies a pixel signal Vpix to each of sub-pixels SPix (described later) of the display device 10 with a touch detection function based on the control signal supplied from the control unit 11.

The drive electrode driver 14 is a circuit that supplies a drive signal Vcom to drive electrodes COML (described later) of the display device 10 with a touch detection function based on the control signal supplied from the control unit 11.

The detection unit 40 is a circuit that detects whether a touch is made on the touch detection unit 30 (a contact state or a proximity state described later) based on the control signal supplied from the control unit 11 and a touch detection signal Vdet supplied from the touch detection unit 30 of the display device 10 with a touch detection function, and obtains coordinates of a touch detection region when a touch is detected on the touch detection unit 30. The detection unit 40 includes a touch detection signal amplification unit 42, an A/D conversion unit 43, a signal processing unit 44, a coordinate extracting unit 45, and a detection timing control unit 46.

The touch detection signal amplification unit 42 amplifies the touch detection signal Vdet supplied from the touch detection unit 30. The touch detection signal amplification unit 42 may include a low-pass analog filter that removes high frequency components (noise components) included in the touch detection signal Vdet, extracts touch components, and outputs the touch components.

Figure 3:
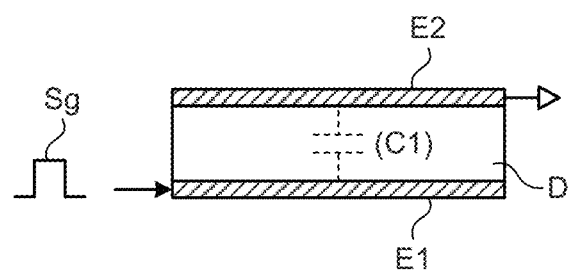
FIG. 3 is an explanatory diagram illustrating a case in which a pointing device is not in a contact or proximity state for explaining a basic principle of an electrostatic capacitance type touch detection mode.
Figure 4:
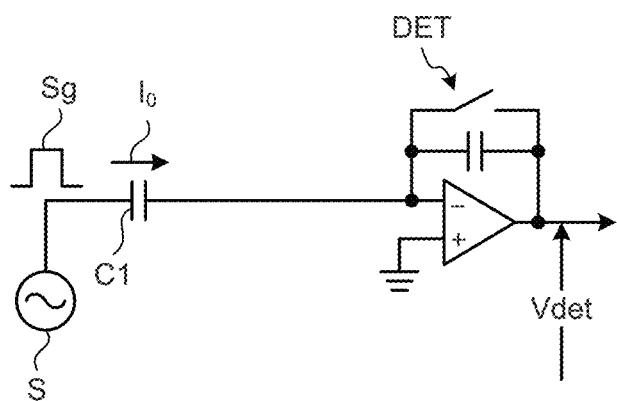
FIG. 4 is an explanatory diagram illustrating an example of an equivalent circuit in a case in which the pointing device is not in a contact or proximity state as illustrated in FIG. 3.
Figure 5:
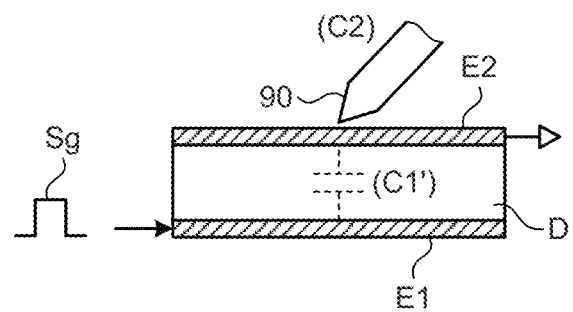
FIG. 5 is an explanatory diagram illustrating a case in which the pointing device is in a contact or proximity state for explaining the basic principle of the electrostatic capacitance type touch detection mode.
Figure 6:
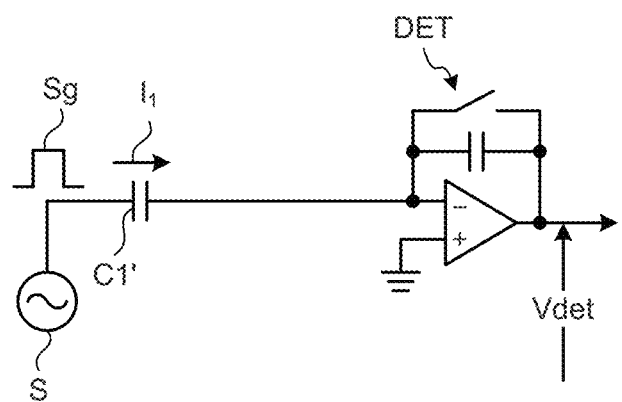
FIG. 6 is an explanatory diagram illustrating an example of the equivalent circuit in a case in which the pointing device is in a contact or proximity state as illustrated in FIG. 5.
Figure 7:
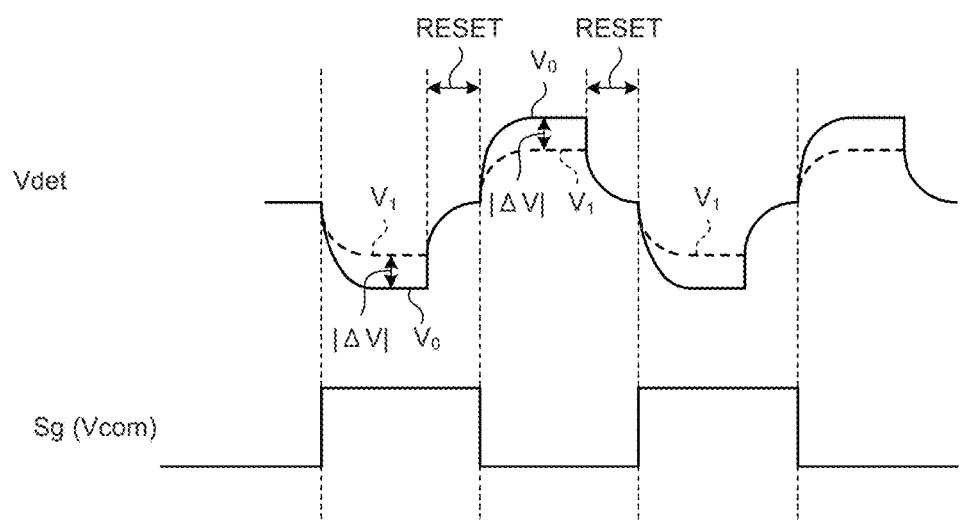
FIG. 7 is a diagram illustrating an example of waveforms of a drive signal and a touch detection signal.

The touch detection unit 30 operates based on a basic principle of electrostatic capacitance type touch detection, and outputs the touch detection signal Vdet. With reference to FIG. 2 to FIG. 7, the following describes a basic principle of touch detection in the display device 10 with a touch detection function according to the embodiment. FIG. 3 is an explanatory diagram illustrating a case in which the pointing device 90 is not in a contact or proximity state for explaining a basic principle of an electrostatic capacitance type touch detection mode. FIG. 4 is an explanatory diagram illustrating an example of an equivalent circuit in a case in which the pointing device 90 is not in a contact or proximity state as illustrated in FIG. 3. FIG. 5 is an explanatory diagram illustrating a case in which the pointing device 90 is in a contact or proximity state for explaining the basic principle of the electrostatic capacitance type touch detection mode. FIG. 6 is an explanatory diagram illustrating an example of the equivalent circuit in a case in which the pointing device 90 is in a contact or proximity state as illustrated in FIG. 5. FIG. 7 is a diagram illustrating an example of waveforms of the drive signal and the touch detection signal.

For example, as illustrated in FIG. 3 and FIG. 5, each of capacitive elements C1 and C1' includes a pair of electrodes, that is, a drive electrode E1 and a touch detection electrode E2 that are arranged to be opposed to each other with a dielectric D interposed therebetween. As illustrated in FIG. 4, one end of the capacitive element C1 is coupled with an AC signal source (drive signal source) S, and the other end thereof is coupled with a voltage detector (touch detection unit) DET. The voltage detector DET is, for example, an integrating circuit included in the touch detection signal amplification unit 42 illustrated in FIG. 2.

When an AC rectangular wave Sg of a predetermined frequency (for example, about several kHz to several hundreds kHz) is applied to the drive electrode E1 (one end of the capacitive element C1) from the AC signal source S, an output waveform (touch detection signal Vdet) appears via the voltage detector DET coupled with the touch detection electrode E2 (the other end of the capacitive element C1). The AC rectangular wave Sg corresponds to a touch drive signal Vcomt described later.

In a state in which the pointing device 90 does not touch a sensor (non-contact state), as illustrated in FIG. 3 and FIG. 4, a current $I_0$ depending on a capacitance value of the capacitive element C1 flows with charge and discharge of the capacitive element C1. As illustrated in FIG. 7, the voltage detector DET converts a change in the current $I_0$ depending on the AC rectangular wave Sg into a change in a voltage (a waveform $V_0$ represented as a solid line).

On the other hand, in a state in which the pointing device 90 touches the sensor (contact state), as illustrated in FIG. 5, a capacitance C2 formed by the pointing device 90 is in contact with or in the vicinity of the touch detection electrode E2, so that a capacitance corresponding to a fringe between the drive electrode E1 and the touch detection electrode E2 is interrupted to function as the capacitive element C having a capacitance value smaller than the capacitance value of the capacitive element C1. With reference to the equivalent circuit illustrated in FIG. 6, a current $I_1$ flows through the capacitive element C1'. As illustrated in FIG. 7, the voltage detector DET converts a change in the current $I_1$ depending on the AC rectangular wave Sg into a change in the voltage (a waveform $V_1$ represented as a dotted line). In this case, amplitude of the waveform $V_1$ is smaller than that of the waveform $V_0$ described above. Accordingly, an absolute value $|\Delta V|$ of a voltage difference between the waveform $V_0$ and the waveform $V_1$ is changed due to an influence of an object approaching from the outside such as the pointing device 90. To detect the absolute value $|\Delta V|$ of the voltage difference between the waveform $V_0$ and the waveform $V_1$ with high accuracy, the voltage detector DET more preferably operates while having a period Reset in which charge and discharge of the capacitor are reset based on the frequency of the AC rectangular wave Sg through switching in the circuit.

The touch detection unit 30 illustrated in FIG. 2 performs touch detection by sequentially scanning each detection block in accordance with the drive signal Vcom (the touch drive signal Vcomt described later) supplied from the drive electrode driver 14.

The touch detection unit 30 outputs the touch detection signal Vdet for each detection block from each of a plurality of touch detection electrodes TDL (described later) via the voltage detector DET illustrated in FIG. 4 or FIG. 6, and supplies the touch detection signal Vdet to the touch detection signal amplification unit 42 of the detection unit 40.

The A/D conversion unit 43 is a circuit that samples each analog signal output from the touch detection signal amplification unit 42 to convert the analog signal into a digital signal at a timing synchronized with the drive signal Vcom.

The signal processing unit 44 includes a digital filter that reduces frequency components (noise components) other than a frequency for sampling the drive signal Vcom included in an output signal from the A/D conversion unit 43. The signal processing unit 44 is a logic circuit that detects, based on the output signal from the A/D conversion unit 43, whether a touch is made on the touch detection unit 30. The signal processing unit 44 performs processing of extracting only a difference voltage caused by the pointing device 90. The difference voltage caused by the pointing device 90 is the absolute value $|\Delta V|$ of the difference between the waveform $V_0$ and the waveform $V_1$ described above. The signal processing unit 44 may perform an operation of averaging absolute values $|\Delta V|$ per detection block to obtain an average value of the absolute value $|\Delta V|$. Accordingly, the signal processing unit 44 can reduce an influence of noise. The signal processing unit 44 compares the detected difference voltage caused by the pointing device 90 with a predetermined threshold voltage. If the different voltage is equal to or larger than the threshold voltage, the signal processing unit 44 determines that an external proximity object approaching from the outside is in a contact state. If the different voltage is smaller than the threshold voltage, the signal processing unit 44 determines that the external proximity object is in a non-contact state.

The coordinate extracting unit 45 is a logic circuit that obtains touch panel coordinates when a touch is detected by the signal processing unit 44. The detection timing control unit 46 performs control so that the A/D conversion unit 43, the signal processing unit 44, and the coordinate extracting unit 45 operate in synchronization with each other. The coordinate extracting unit 45 outputs the touch panel coordinates as a signal output Vout.

Figure 8:
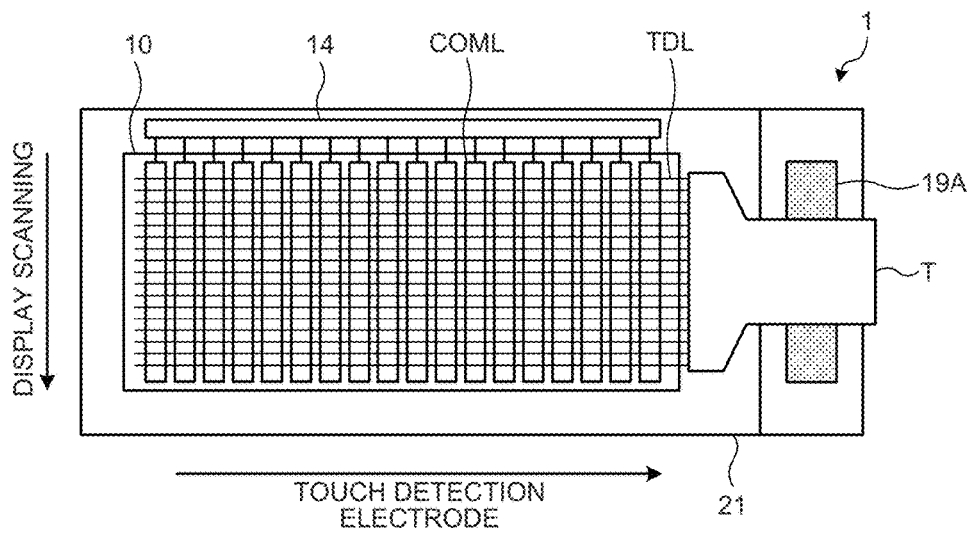
FIG. 8 is a diagram illustrating an example of a module on which the display device is mounted.
Figure 9:
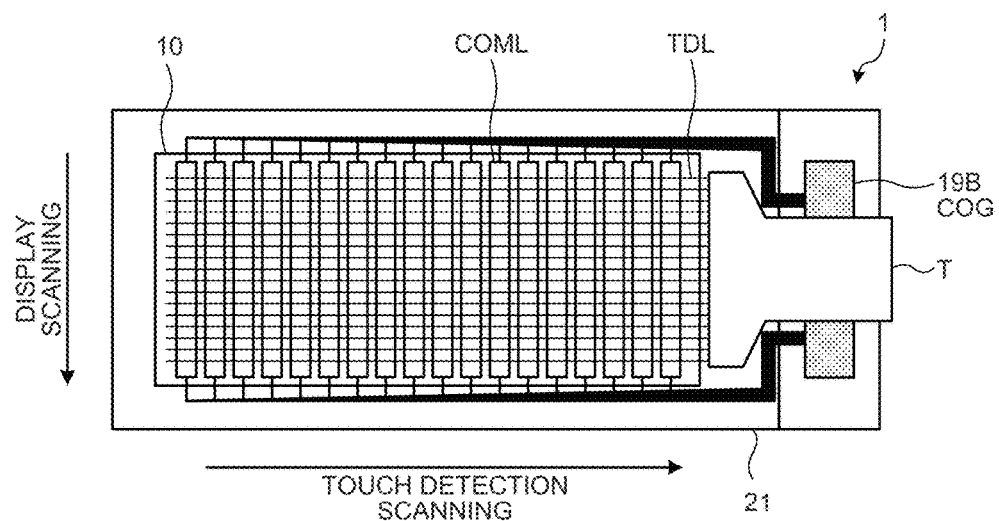
FIG. 9 is a diagram illustrating an example of the module on which the display device is mounted.

FIG. 8 and FIG. 9 are diagrams each illustrating an example of a module on which the display device 10 with a touch detection function is mounted. As illustrated in FIG. 8, when the display device 10 with a touch detection function is mounted on the module, the drive electrode driver 14 may be formed on a thin film transistor (TFT) substrate 21, which is a glass substrate.

As illustrated in FIG. 8, the display device 10 with a touch detection function includes the display device 10 with a touch detection function, the drive electrode driver 14, and a chip on glass (COG) 19A. In the display device 10 with a touch detection function, schematically illustrated are the drive electrodes COML and the touch detection electrodes TDL arranged intersecting with the drive electrodes COML in a grade separated manner, in a direction perpendicular to the surface of the TFT substrate 21 (described later). That is, the drive electrodes COML are formed in a direction along one side of the display device 10 with a touch detection function, and the touch detection electrodes TDL are formed in a direction along the other side of the display device 10 with a touch detection function. An output end of the touch detection electrode TDL is coupled with the detection unit 40 mounted on the outside of the module via a terminal unit T that is arranged on the other side of the display device 10 with a touch detection function and constituted of a flexible substrate and the like. The drive electrode driver 14 is formed on the TFT substrate 21, which is a glass substrate. The COG 19A is a chip mounted on the TFT substrate 21, and includes various circuits required for display operation such as the control unit 11, the gate driver 12, and the source driver 13 illustrated in FIG. 2. As illustrated in FIG. 9, the drive electrode driver 14 may be included in a COG 19B of the display device 10 with a touch detection function.

As illustrated in FIG. 9, the display device 10 with a touch detection function includes the COG 19B. The COG 19B illustrated in FIG. 9 includes the drive electrode driver 14 in addition to the various circuits described above required for display operation. As described later, the display device 10 with a touch detection function performs line-sequential scanning for each horizontal line in display operation. That is, the display device 10 with a touch detection function performs display scanning in parallel with a direction along one side of the display device 10 with a touch detection function. On the other hand, the display device 10 with a touch detection function performs line-sequential scanning for each detection line by sequentially applying the drive signal Vcom to the drive electrodes COML in touch detection operation. That is, the display device 10 with a touch detection function performs touch detection scanning in parallel with a direction along the other side of the display device 10 with a touch detection function.

Figure 10:
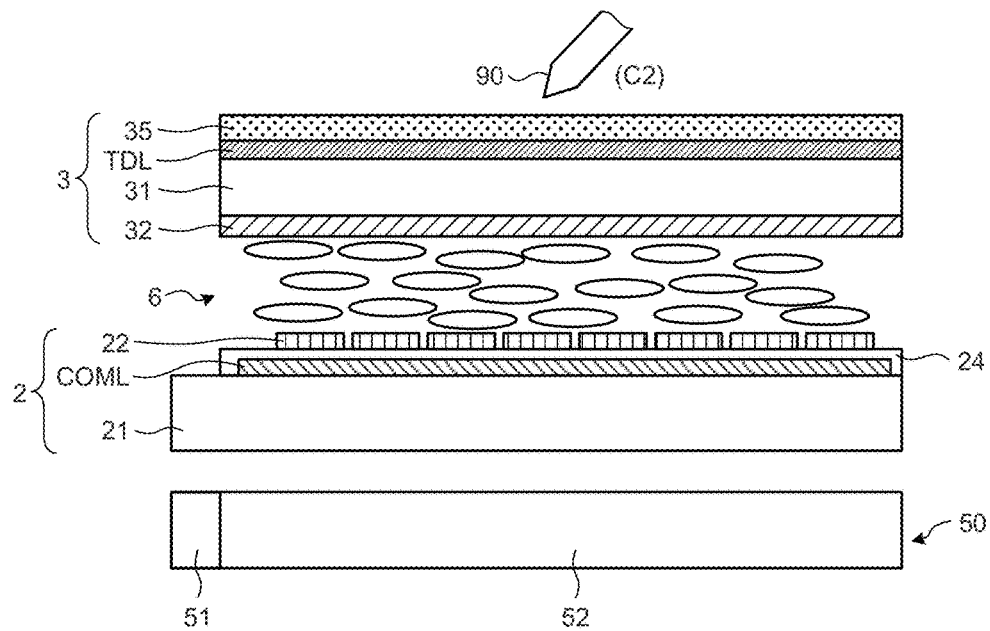
FIG. 10 is a cross-sectional view illustrating a schematic structure of a display device with a touch detection function according to the embodiment.
Figure 11:
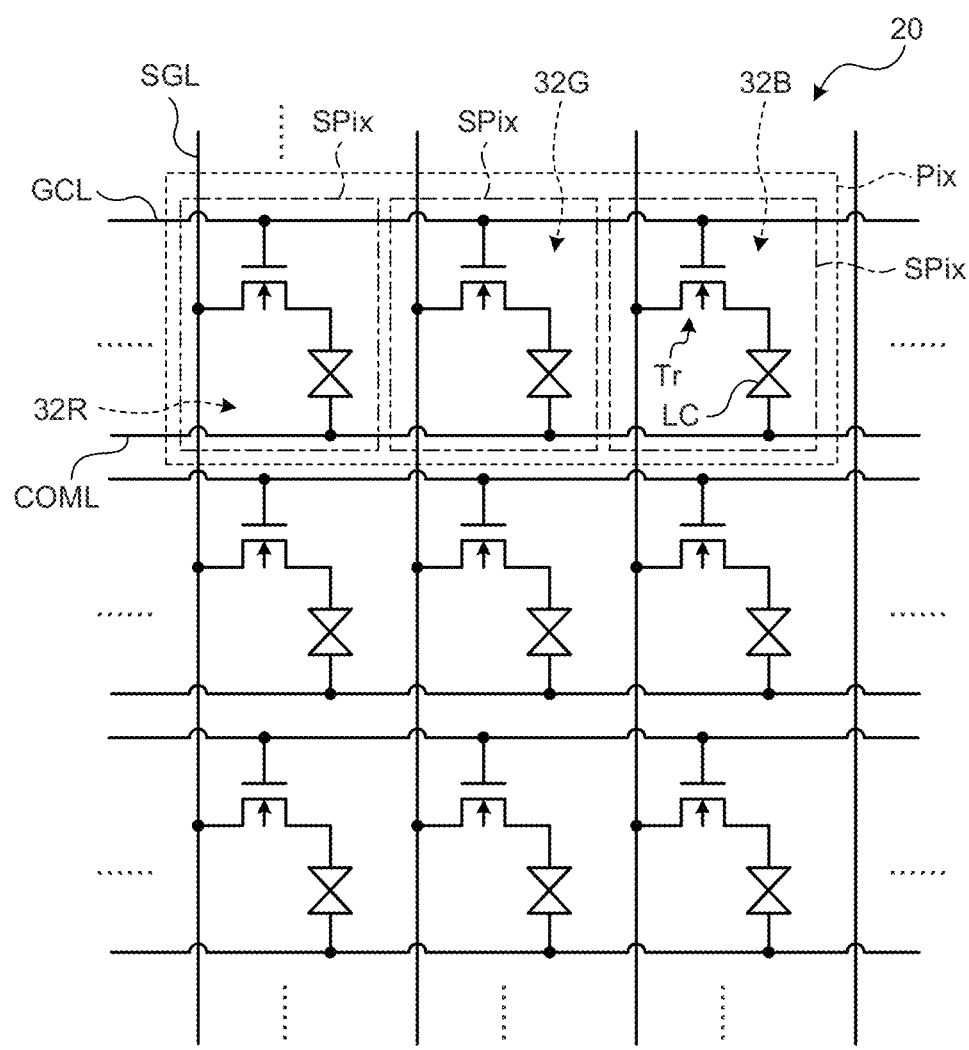
FIG. 11 is a circuit diagram illustrating a pixel arrangement of the display device with a touch detection function according to the embodiment of the present invention.

Next, the following describes a configuration example of the display device 10 with a touch detection function in detail. FIG. 10 is a cross-sectional view illustrating a schematic structure of the display device with a touch detection function according to the embodiment. FIG. 11 is a circuit diagram illustrating a pixel arrangement of the display device with a touch detection function according to the embodiment. The display device 10 with a touch detection function includes a pixel substrate 2, a counter substrate 3 arranged to be opposed to the surface of the pixel substrate 2 in the perpendicular direction, and a liquid crystal layer 6 interposed between the pixel substrate 2 and the counter substrate 3.

The pixel substrate 2 includes the TFT substrate 21 serving as a circuit board, a plurality of pixel electrodes 22 arranged in a matrix on the TFT substrate 21, the drive electrodes COML formed between the TFT substrate 21 and the pixel electrode 22, and an insulating layer 24 that insulates the pixel electrode 22 from the drive electrode COML. A TFT element Tr of each sub-pixel SPix illustrated in FIG. 11 and wiring such as signal lines SGL and scanning lines GCL are formed on the TFT substrate 21. Each of the signal lines SGL supplies the pixel signal Vpix to the corresponding pixel electrode 22 illustrated in FIG. 10. The scanning lines GCL drive the TFT elements Tr. Thus, each of the signal lines SGL extends on a plane parallel with the surface of the TFT substrate 21, and supplies the pixel signal Vpix to the corresponding pixel for displaying an image. The display unit 20 illustrated in FIG. 11 includes the sub-pixels SPix arranged in a matrix. Each of the sub-pixels SPix includes a TFT element Tr and a liquid crystal element LC. The TFT element Tr is constituted of a thin film transistor. In this example, the TFT element Tr is constituted of an n-channel metal oxide semiconductor (MOS) TFT. One of a source and a drain of the TFT element Tr is coupled with the signal line SGL, a gate thereof is coupled with the scanning line GCL, and the other one of the source and the drain is coupled with one end of the liquid crystal element LC. For example, one end of the liquid crystal element LC is coupled with the drain of the TFT element Tr, and the other end thereof is coupled with the drive electrode COML.

Each of the sub-pixels SPix illustrated in FIG. 11 is coupled with the other sub-pixels SPix belonging to the same row in the display unit 20 via a scanning line GCL. Each of the scanning lines GCL is coupled with the gate driver 12, and receives the scanning signal Vscan supplied from the gate driver 12. Each of the sub-pixels SPix is coupled with the other sub-pixels SPix belonging to the same column in the display unit 20 via a signal line SGL. Each of the signal lines SGL is coupled with the source driver 13, and receives the pixel signal Vpix supplied from the source driver 13. Each of the sub-pixels SPix is also coupled with the other sub-pixels SPix belonging to the same row in the display unit 20 via a drive electrode COML. Each of the drive electrodes COML is coupled with the drive electrode driver 14, and receives the drive signal Vcom supplied from the drive electrode driver 14. That is, in this example, the sub-pixels SPix belonging to the same row share one drive electrode COML. A direction in which the drive electrodes COML according to the embodiment extend is parallel with a direction in which the scanning lines GCL extend. The direction in which the drive electrodes COML according to the embodiment extend is not limited. For example, the direction in which the drive electrodes COML extend may be parallel with a direction in which the signal lines SGL extend.

The gate driver 12 illustrated in FIG. 2 applies the scanning signal Vscan to the gates of the TFT elements Tr of the sub-pixels SPix in pixels Pix via the scanning line GCL illustrated in FIG. 11 to sequentially select, as a display driving target, one row (one horizontal line) out of the sub-pixels SPix formed in a matrix in the display unit 20. The source driver 13 illustrated in FIG. 2 supplies, via the signal line SGL illustrated in FIG. 11, the pixel signal Vpix to each of the sub-pixels SPix constituting one horizontal line that is sequentially selected by the gate driver 12. The sub-pixels SPix perform display for one horizontal line based on the supplied pixel signal Vpix. The drive electrode driver 14 illustrated in FIG. 2 applies the drive signal Vcom to the drive electrodes COML in each block including a predetermined number of drive electrodes COML illustrated in FIG. 8 and FIG. 9, thereby driving the drive electrodes COML in each drive electrode block.

As described above, in the display unit 20, the gate driver 12 drives the scanning lines GCL to perform line-sequential scanning in a time division manner, thereby sequentially selecting one horizontal line. In the display unit 20, the source driver 13 supplies the pixel signal Vpix to each of the sub-pixels SPix belonging to one horizontal line to perform display for each horizontal line. In performing the display operation, the drive electrode driver 14 applies the drive signal Vcom to a block including drive electrodes COML corresponding to the one horizontal line.

Figure 12:
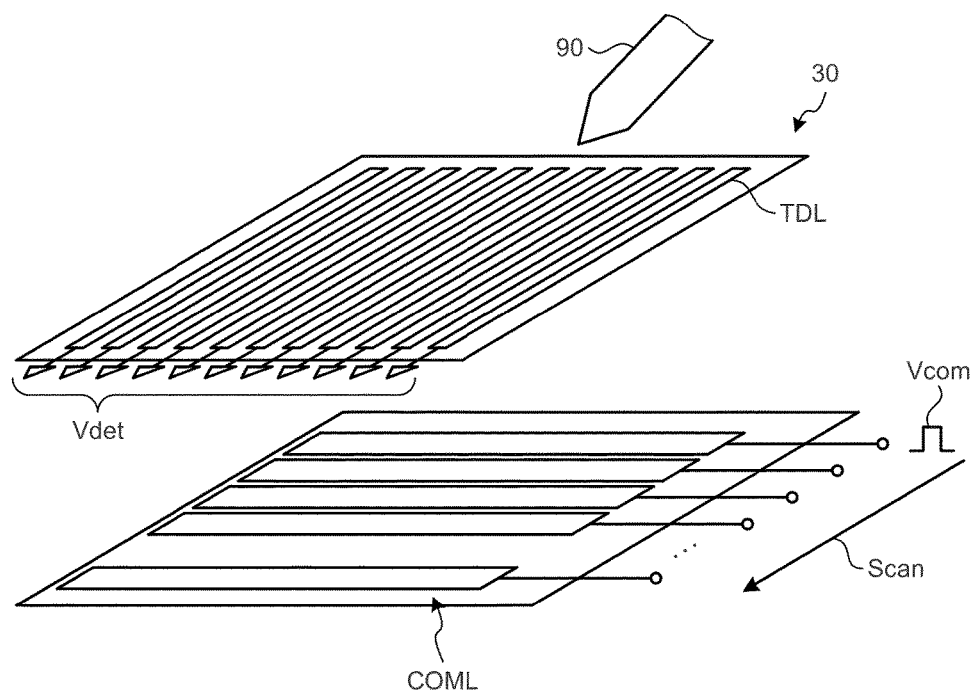
FIG. 12 is a perspective view illustrating an arrangement example of drive electrodes and touch detection electrodes of the display device with a touch detection function according to the embodiment of the present invention.

The drive electrode COML according to the embodiment functions as a drive electrode for the display unit 20, and also as a drive electrode for the touch detection unit 30. FIG. 12 is a perspective view illustrating an arrangement example of the drive electrodes and the touch detection electrodes of the display device with a touch detection function according to the embodiment. As illustrated in FIG. 10, each of the drive electrodes COML illustrated in FIG. 12 is opposed to the pixel electrodes 22 in a direction perpendicular to the surface of the TFT substrate 21. The touch detection unit 30 includes the drive electrodes COML arranged in the pixel substrate 2 and the touch detection electrodes TDL arranged in the counter substrate 3. The touch detection electrodes TDL are stripe electrode patterns extending in a direction intersecting with a direction in which electrode patterns of the drive electrodes COML extend. The touch detection electrodes TDL are opposed to the drive electrodes COML in a direction perpendicular to the surface of the TFT substrate 21. Each electrode pattern of the touch detection electrode TDL is coupled with an input end of the touch detection signal amplification unit 42 of the detection unit 40. In the electrode patterns in which the drive electrodes COML intersect with the touch detection electrodes TDL, a capacitance is caused at each of the intersections thereof. The touch detection electrodes TDL or the drive electrodes COML (drive electrode blocks) are not necessarily divided into a plurality of stripe-shaped pieces. For example, the touch detection electrodes TDL or the drive electrodes COML (drive electrode blocks) may have a comb-teeth shape. Alternatively, the touch detection electrodes TDL or the drive electrodes COML (drive electrode blocks) may be divided into a plurality of pieces, and a shape of a slit for dividing the drive electrodes COML may be a straight line or a curved line.

With this configuration, in performing touch detection operation by the touch detection unit 30, the drive electrode driver 14 drives the drive electrode blocks so as to perform line-sequential scanning of the drive electrode blocks in a time division manner. Accordingly, one detection block of the drive electrodes COML is sequentially selected in a scanning direction Scan. The touch detection signal Vdet is then output from the touch detection electrode TDL. In this way, the touch detection unit 30 performs touch detection for one detection block. That is, the drive electrode block corresponds to the drive electrode E1 according to the basic principle of touch detection described above, the touch detection electrode TDL corresponds to the touch detection electrode E2, and the touch detection unit 30 detects a touch according to the basic principle. As illustrated in FIG. 12, the electrode patterns intersecting with each other constitute an electrostatic capacitance type touch sensor in a matrix. Thus, by scanning the entire touch detection surface of the touch detection unit 30, a position touched by an external proximity object such as the pointing device 90 can be detected.

The liquid crystal layer 6 modulates light passing therethrough depending on a state of an electric field. Examples of the liquid crystal layer 6 include, but are not limited to, a liquid crystal display device including liquid crystals of lateral electric-field mode such as in-plane switching (IPS) including fringe field switching (FFS). An orientation film may be arranged between the liquid crystal layer 6 and the pixel substrate 2 illustrated in FIG. 10, and between the liquid crystal layer 6 and the counter substrate 3.

The counter substrate 3 includes a glass substrate 31 and a color filter 32 formed on one surface of the glass substrate 31. The touch detection electrodes TDL of the touch detection unit 30 are formed on the other surface of the glass substrate 31, and a polarizing plate 35 is arranged on the touch detection electrode TDL.

In the color filter 32 illustrated in FIG. 10, for example, color regions of the color filter colored in three colors of red (R), green (G), and blue (B) are periodically arranged, color regions 32R, 32G, and 32B (refer to FIG. 11) of three colors R, G, and B are associated with the respective sub-pixels SPix illustrated in FIG. 11, and the pixel Pix is constituted of a group of the color regions 32R, 32G, and 32B. The pixels Pix are arranged in a matrix along a direction parallel with the scanning line GCL and a direction parallel with the signal line SGL, and form a display region Ad described later. The color filter 32 is opposed to the liquid crystal layer 6 in a direction perpendicular to the TFT substrate 21. In this way, the sub-pixel SPix can perform monochromatic color display. The color filter 32 may be formed with any other combination of colors that are different from each other. The color filter 32 is not necessarily provided. In this way, a region without the color filter 32, that is, a non-colored sub-pixel SPix may be present.

Each of the drive electrodes COML functions as a common drive electrode for the display unit 20 and also as the drive electrode for the touch detection unit 30, so that drive signals Vcom may influence each other. To solve this problem, the drive signals Vcom are applied to the drive electrode COML separately in a display period B for performing display operation and a touch detection period A for performing touch detection operation. In the display period B for performing display operation, the drive electrode driver 14 applies the drive signal Vcom as a display drive signal. In the touch detection period A for performing touch detection operation, the drive electrode driver 14 applies the drive signal Vcom as a touch drive signal. In the following description, the drive signal Vcom serving as the display drive signal is represented as a display drive signal Vcomd, and the drive signal Vcom serving as the touch drive signal is represented as a touch drive signal Vcomt.

The control unit 11 supplies the control signal to each of the gate driver 12, the source driver 13, the drive electrode driver 14, and the detection unit 40 based on the video signal Vdisp supplied from the outside, and performs control so that these components operate in synchronization with each other. The gate driver 12 supplies the scanning signal Vscan to the display unit 20 in the display period B, and sequentially selects one horizontal line as the display driving target. The source driver 13 supplies the pixel signal Vpix to each pixel Pix constituting the one horizontal line selected by the gate driver 12 in the display period B.

In the display period B, the drive electrode driver 14 applies the display drive signal Vcomd to the drive electrode block corresponding to one horizontal line. In the touch detection period A, the drive electrode driver 14 sequentially applies the touch drive signal Vcomt to the drive electrode block corresponding to touch detection operation, and sequentially selects one detection block. The display device 10 with a touch detection function performs display operation based on signals supplied from the gate driver 12, the source driver 13, and the drive electrode driver 14 in the display period B. The display device 10 with a touch detection function performs touch detection operation based on the drive signal Vcomt supplied from the drive electrode driver 14 in the touch detection period A, and outputs the touch detection signal Vdet from the touch detection electrode TDL. The touch detection signal amplification unit 42 amplifies the touch detection signal Vdet and outputs the amplified analog signal. The A/D conversion unit 43 converts the analog signal output from the touch detection signal amplification unit 42 into a digital signal at a timing synchronized with the touch drive signal Vcomt. The signal processing unit 44 detects, based on the output signal from the A/D conversion unit 43, whether a touch is made on the touch detection unit 30. The coordinate extracting unit 45 obtains touch panel coordinates when the signal processing unit 44 detects a touch.

Next, the following describes a specific operation of the display device 10 with a touch detection function. FIG. 13 is a timing waveform chart illustrating an operation example of the display device 10 with a touch detection function according to the embodiment. As illustrated in FIG. 13, the display unit 20 performs display by sequentially scanning each horizontal line of adjacent (n−1)-th, n-th, and (n+1)-th scanning lines GCL among the scanning lines GCL in accordance with the scanning signal Vscan supplied from the gate driver 12. Similarly, the drive electrode driver 14 supplies the drive signal Vcom to adjacent (n−1)-th, n-th, and (n+1)-th drive electrodes COML in the display device 10 with a touch detection function based on the control signal supplied from the control unit 11.

In this way, the display device 10 with a touch detection function performs touch detection operation (touch detection period A) and display operation (display period B) in a time division manner for each display horizontal period (1H). In the touch detection operation, a different drive electrode COML is selected for each display horizontal period 1H, and the drive signal Vcom is applied thereto to perform scanning for touch detection. The operation will be described below in detail.

First, the gate driver 12 applies the scanning signal Vscan to the (n−1)-th scanning line GCL, and a scanning signal Vscan(n−1) is changed from a low level to a high level. Accordingly, one display horizontal period (1H) is started.

Next, in the touch detection period A, the drive electrode driver 14 applies the drive signal Vcom to the (n−1)-th drive electrode COML, and a drive signal Vcom(n−1) is changed from a low level to a high level. The drive signal Vcom(n−1) is transmitted to the touch detection electrode TDL via a capacitance, and the touch detection signal Vdet is changed. Next, when the drive signal Vcom(n−1) is changed from a high level to a low level, the touch detection signal Vdet is changed similarly. The waveform of the touch detection signal Vdet in the touch detection period A corresponds to the touch detection signal Vdet according to the basic principle of touch detection described above. The A/D conversion unit 43 performs A/D conversion on the touch detection signal Vdet in the touch detection period A to perform touch detection. Thus, the display device 10 with a touch detection function performs touch detection for one detection line.

Next, in the display period B, the source driver 13 applies the pixel signal Vpix to each of the signal lines SGL, and performs display for one horizontal line. As illustrated in FIG. 13, a change in the pixel signal Vpix may be transmitted to the touch detection electrode TDL via a capacitance formed between the drive electrode and the touch detection electrode, and the touch detection signal Vdet may be changed. However, in the display period B, the A/D conversion unit 43 does not perform A/D conversion, so that the change in the pixel signal Vpix can be prevented from influencing touch detection. After the pixel signal Vpix is supplied by the source driver 13, the gate driver 12 causes the scanning signal Vscan(n−1) of the (n−1)-th scanning line GCL to be changed from a high level to a low level, and one display horizontal period (1H) is ended.

Next, the gate driver 12 applies the scanning signal Vscan to the n-th scanning line GCL different from the previous one, and a scanning signal Vscan(n) is changed from a low level to a high level. Accordingly, the next one display horizontal period (1H) is started.

In the next touch detection period A, the drive electrode driver 14 applies the drive signal Vcom to the n-th drive electrode COML different from the previous one. The A/D conversion unit 43 then performs A/D conversion on the change in the touch detection signal Vdet to perform touch detection for one detection line.

Next, in the display period B, the source driver 13 applies the pixel signal Vpix to the signal line SGL to perform display for one horizontal line. The drive electrode driver 14 applies the display drive signal Vcomd to the drive electrode COML as a common potential. An electric potential of the display drive signal Vcomd is, for example, a low-level electric potential of the drive signal Vcom in the touch detection period A. The display device 10 with a touch detection function according to the embodiment performs dot-inversion driving, so that polarity of the pixel signal Vpix applied by the source driver 13 in the present display horizontal period is inverted as compared with that in the previous one display horizontal period. After the display period B is ended, the one display horizontal period 1H is ended.

Subsequently, by repeating the operation described above, the display device 10 with a touch detection function performs display operation by scanning the entire display surface and performs touch detection operation by scanning the entire touch detection surface.

In one display horizontal period (1H), the display device 10 with a touch detection function performs touch detection operation in the touch detection period A and performs display operation in the display period B. In this way, the touch detection operation and the display operation are performed in different periods, so that both of the display operation and the touch detection operation can be performed in the same one display horizontal period, and the display operation can be prevented from influencing touch detection.

The light source device 50 is arranged to face a back surface of the display device 10 with a touch detection function, that is, a surface opposite to the display surface. The light source device 50 emits light from the back surface side of the display device 10, thereby functioning as lighting of the display device 10 with a touch detection function. Specifically, for example, the light source device 50 includes a light source 51 such as a light emitting diode that emits light when being supplied with power, and a light guide plate 52 that guides the light from the light source 51 to be emitted to the display unit 20. The light source device 50 is provided to the display unit 20 including a transmissive liquid crystal display element as a display element. The light source device 50 is not provided when the display unit 20 is a self-luminous display device (for example, an organic EL display device).

The display device 10 with a touch detection function according to the embodiment has a function of adjusting brightness of a screen. Specifically, a user can set the brightness of the screen via a setting screen and the like (not illustrated), for example. The light source device 50 operates to emit light with brightness corresponding to such a setting. When the display unit 20 is a self-luminous display device, each display element emits light with the brightness corresponding to such a setting.

The acquisition unit 70, the determination unit 80, and the display control unit 60 are, for example, circuits arranged in the display device 10 with a touch detection function. The acquisition unit 70, the determination unit 80, and the display control unit 60 perform signal processing in accordance with a predetermined processing procedure. Functions of the acquisition unit 70, the determination unit 80, and the display control unit 60 will be described later.

Next, the following describes the pointing device 90. FIG. 14 is a diagram illustrating a main configuration of the pointing device 90. The pointing device 90 includes a sensing unit 91, a color sensor 92, a data conversion unit 93, and a transmission unit 94. The pointing device 90 according to the embodiment is, for example, a stylus. The sensing unit 91 is arranged at a tip of the pointing device 90, and the tip is formed to be tapered (in a cone shape) imitating a writing tool. However, this shape is merely an example of the pointing device 90 and not limited thereto. The shape can be appropriately modified.

The sensing unit 91 guides light at a touching position on the display surface of the display unit 20 to the color sensor 92. Specifically, the sensing unit 91 is one end of, for example, an optical fiber, and arranged so that light enters from the tip of the pointing device 90, for example. The entered light is guided to the color sensor 92 via a light guiding unit such as an optical fiber coupling the sensing unit 91 with the color sensor 92.

The color sensor 92 detects a display color of the display surface at an instruction input position. Specifically, the color sensor 92 is a circuit that outputs an electric signal depending on a color of the light from the display surface that has entered via the sensing unit 91. The data conversion unit 93 is a circuit that converts an analog electric signal output from the color sensor 92 into a digital signal of a predetermined format (for example, gradation values of R, G, and B). In this embodiment, the color sensor 92 and the data conversion unit 93 are provided independently from each other. Alternatively, the color sensor 92 and the data conversion unit 93 may be integrated with each other. The transmission unit 94 transmits information indicating a display color at the instruction input position detected by the color sensor 92. Specifically, the transmission unit 94 includes a communication device having a function of communicating through short-range wireless communication, for example. The transmission unit 94 transmits the digital signal output from the data conversion unit 93, that is, digitized data of the information indicating the display color of the display surface at the instruction input position detected by the color sensor 92.

Next, the following describes the information indicating the display color transmitted from the pointing device 90, and a relation between the display control unit 60, the acquisition unit 70, and the determination unit 80 included in the display device 10 with a touch detection function. The display control unit 60 sets the color of the image so that the color to be displayed is different for each of a plurality of partial regions constituting the display region of the display unit 20.

FIG. 15 is a schematic diagram illustrating a relation between the partial regions and the colors of the images. To simplify description of processing performed by the display control unit 60, a case in which the video signal Vdisp indicating white (for example, RGB=(255, 255, 255)) is input to the entire display region of the display unit 20 is described later with reference to FIG. 15 and FIG. 16. In a case in which the video signal Vdisp indicating another color is input thereto, the same processing is performed. The display control unit 60 sets a plurality of partial regions to the display region of the display unit 20. Specifically, as illustrated in FIG. 15 for example, a plurality of partial regions are set to the display region of the display unit 20 in which P pixels Pix are arranged along the X-direction and Q pixels Pix are arranged along the Y-direction. When V partial regions are arranged along the X-direction and W partial regions are arranged along the Y-direction, $1 \leq V \leq P$ and $1 \leq W \leq Q$ are satisfied. However, both of V and W are not 1, and at least one of V and W is 2 or more. The schematic diagram in FIG. 15 exemplifies a case in which V=4 and W=8 are satisfied. To indicate a correspondence relation with FIG. 16, reference numerals are given assuming that four partial regions such as partial regions A1, A2, A3, and A4 are arranged along the X-direction, and eight partial regions such as partial regions A1, B1, C1, D1, . . . are arranged along the Y-direction.

FIG. 16 is a diagram illustrating an example of the color for each of the partial regions. The display control unit 60 sets the color of the image so that the color to be displayed is different for each of the partial regions. Specifically, as illustrated in FIG. 16 for example, the display control unit 60 determines an output signal Vedit for each of the partial regions so that combinations of gradation values of R, G, and B are different in all of the partial regions. More specifically, the display control unit 60 sets a color difference by which the color sensor 92 of the pointing device 90 can identify the color of each of the partial regions. In this embodiment, the display control unit 60 sets such a color difference to each of the partial regions, and causes the color of each partial region to be as close to the color indicated by the video signal Vdisp as possible. In this embodiment, the display control unit 60 causes a degree of color difference between adjacent partial regions to be a minimum difference that can be identified by the color sensor 92 of the pointing device 90.

As described above, described herein is a case in which the video signal Vdisp indicating white (for example, RGB=(255, 255, 255)) is input to the entire display region of the display unit 20. Accordingly, in the example illustrated in FIG. 16, the color of each of the partial regions A1, A2, . . . has gradation values of RGB=(255, 255, 255) or gradation values close thereto. The color setting for each of the partial regions causes the display unit 20 to provide a gradational display output in which, strictly speaking, the color is different for each of the partial regions. In this embodiment, a degree of color difference between adjacent partial regions is a minimum difference that can be identified by the color sensor 92 of the pointing device 90, so that the colors displayed in the entire display region appear, to a user of the touch detection system 1, to be substantially the same (white).

In FIG. 16, by way of example, a color of the partial region A1 is assumed to be RGB=(255, 255, 255). For the column of the partial region A1 in the Y-direction (column direction), the gradation values of RGB are set to satisfy R<G=B except the partial region A1. For the column of the partial region A2, the gradation values of RGB are set to satisfy R<G>B. For the column of the partial region A3, the gradation values of RGB are set to satisfy R≥G<B. For the column of the partial region A4, the gradation values of RGB are set to exclude RGB=(255, 255, 255) and satisfy R≥G=B. According to such settings, as illustrated in FIG.

15, RGB=(251, 251, 251) is satisfied in the partial region H4, for example. A method of setting the gradation values of RGB as illustrated in FIG. 16 is merely an example of a method of causing the gradation values to be different for each of a plurality of partial regions, and the method is not limited thereto. Actually, the gradation values for each of the partial regions are determined so that the color difference between the partial regions cannot be easily recognized by a user.

The number of partial regions, the shape of the partial region, and other specific aspects in the display region are freely-selectable. However, the number of the partial regions is equal to or larger than 2. For example, one pixel Pix may be defined to be one partial region. This means that a unit of the partial region is substantially the minimum.

Figure 17:
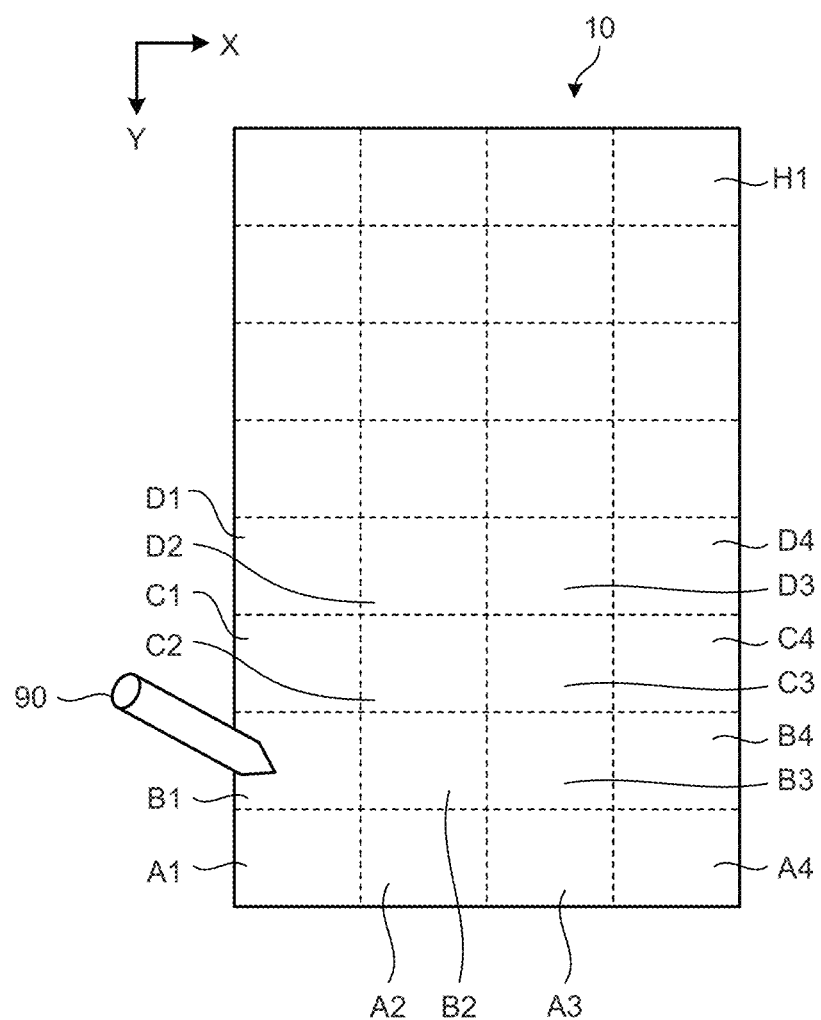
FIG. 17 is a schematic diagram illustrating an example of a relation between an instruction input position of the pointing device and the partial region.
Figure 18:
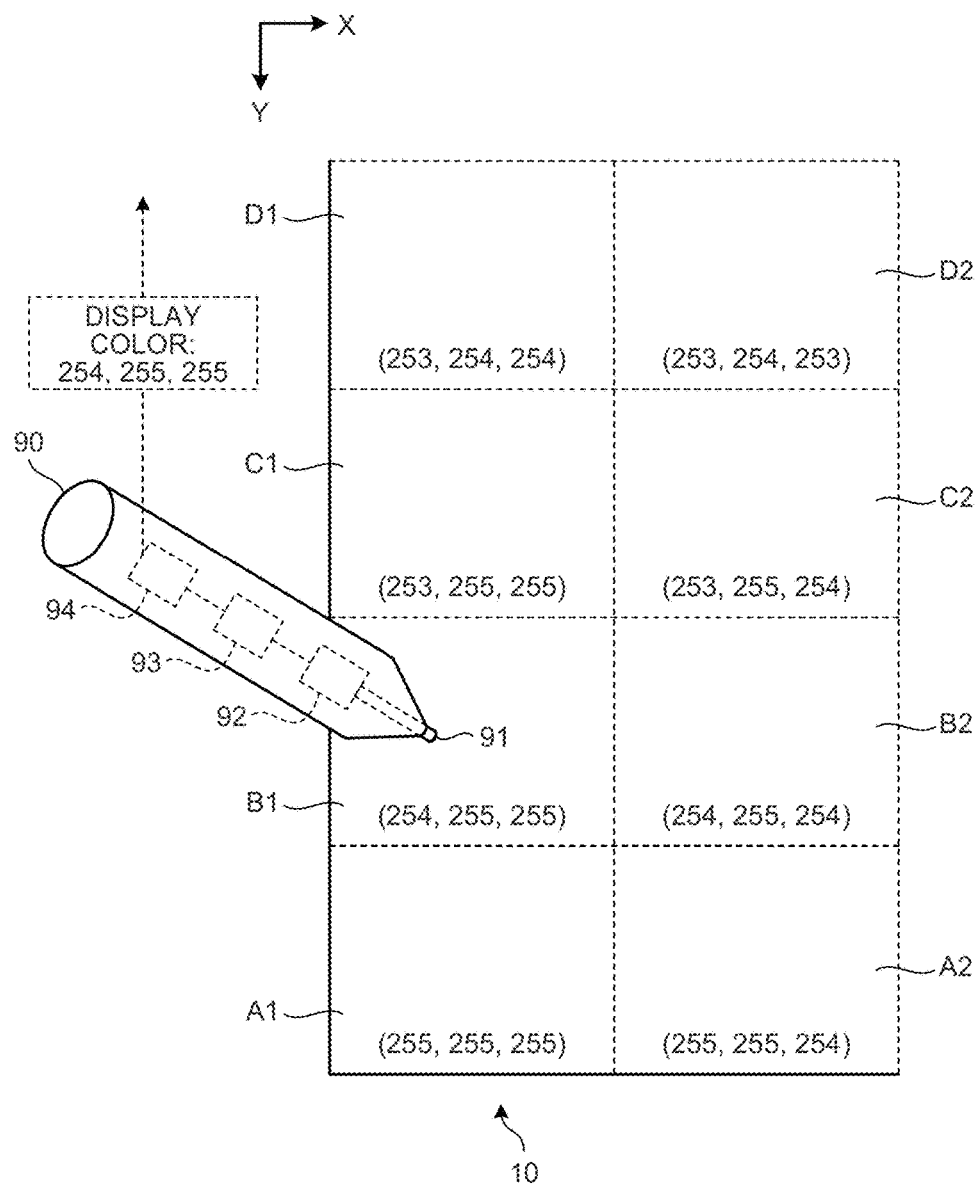
FIG. 18 is an enlarged view of the vicinity of the instruction input position of the pointing device illustrated in FIG. 17.

With reference to FIG. 17 and FIG. 18, the following describes a basic concept of determination processing according to the embodiment. FIG. 17 is a schematic diagram illustrating an example of a relation between the instruction input position of the pointing device 90 and the partial region. FIG. 18 is an image drawing illustrating an example of information transmitted from the pointing device 90. The partial regions of the display device 10 with a touch detection function illustrated in FIG. 18 are an enlarged view of the vicinity of the instruction input position of the pointing device 90 illustrated in FIG. 17. FIG. 18 is an enlarged view of 2×4 (X-direction×Y-direction) partial regions on the lower left side in FIG. 17. As illustrated in FIG. 17 and FIG. 18, when a touch is made at the instruction input position corresponding to a specific partial region (for example, the partial region B1) by the pointing device 90, the color corresponding to the gradation values of RGB= (254, 255, 255) is detected by the color sensor 92, and information indicating such a detection result is transmitted by the transmission unit 94.

The acquisition unit 70 acquires the information indicating the display color at the instruction input position detected by the color sensor 92 of the pointing device 90. Specifically, the acquisition unit 70 includes a communication device for short-range wireless communication that can receive data transmitted from the transmission unit 94, and receives and acquires the data transmitted from the transmission unit 94, that is, digitized data of the information indicating the display color of the display surface at the instruction input position detected by the color sensor 92. Examples of the short-range wireless communication used by the acquisition unit 70 and the transmission unit 94 include a predetermined communication standard such as Bluetooth (registered trademark). However, this is merely an example of a configuration for implementing communication between the display device 10 with a touch detection function and the pointing device 90, and the embodiment is not limited thereto. The acquisition unit 70 included in the display device 10 with a touch detection function and the transmission unit 94 can employ any communication technology that enables the acquisition unit 70 and the transmission unit 94 to communicate with each other.

The determination unit 80 performs determination processing for determining the instruction input position based on the color of the image displayed by the display unit 20 and the color indicated by the information acquired by the acquisition unit 70. Specifically, the determination unit 80 collates the color indicated by the information acquired by the acquisition unit 70 with the color of each of the partial regions set by the display control unit 60 and identifies a partial region having the same color as the color indicated by the information acquired by the acquisition unit 70. The color indicated by the information acquired by the acquisition unit 70 means the color detected by the color sensor 92 of the pointing device 90. The color detected by the color sensor 92 of the pointing device 90 is the display color at a position touched by the sensing unit 91 of the pointing device 90 (that is, the instruction input position). The determination unit 80 determines that the instruction input position of the pointing device 90 is in the identified partial region. In this way, in the determination processing, the determination unit 80 collates the color of the image of each of the partial regions with the color indicated by the information acquired by the acquisition unit 70, the color of the image being set to be different for each of the partial regions constituting the display region of the display unit 20. Data indicating the arrangement of the partial regions in the display region of the display unit 20 and the color of the image that is set to be different for each of the partial regions is stored, for example, as color setting data 81 in a memory included in the determination unit 80 (refer to FIG. 25). The determination unit 80 collates the color setting data 81 with the color indicated by the information acquired by the acquisition unit 70.

The determination unit 80 performs palm rejection processing using a determination result of the determination processing. The following describes the palm rejection processing with reference to FIG. 19 and FIG. 20.

Figure 19:
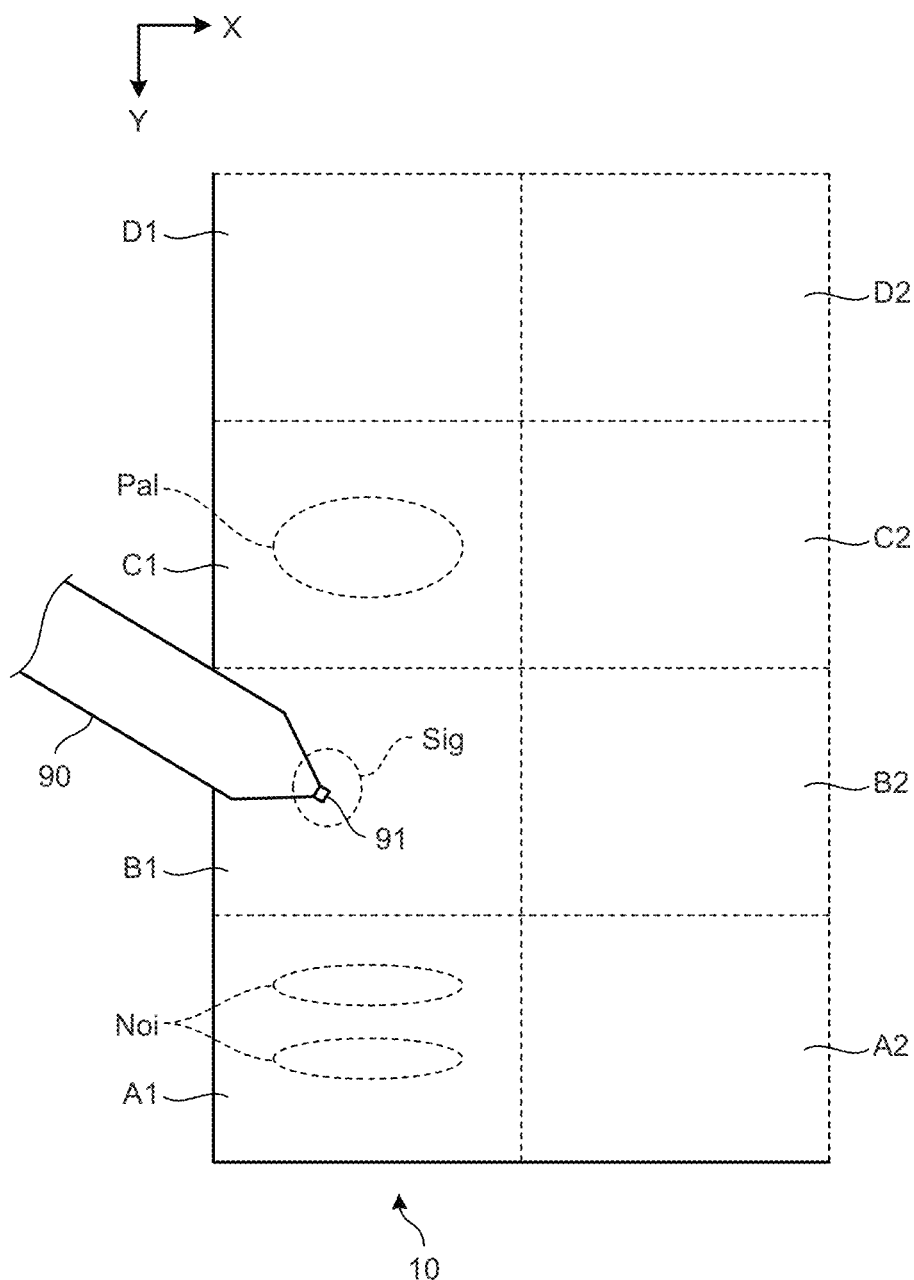
FIG. 19 is a schematic diagram illustrating an example of a state in which contact of the pointing device and contact of another object are both detected.
Figure 20:
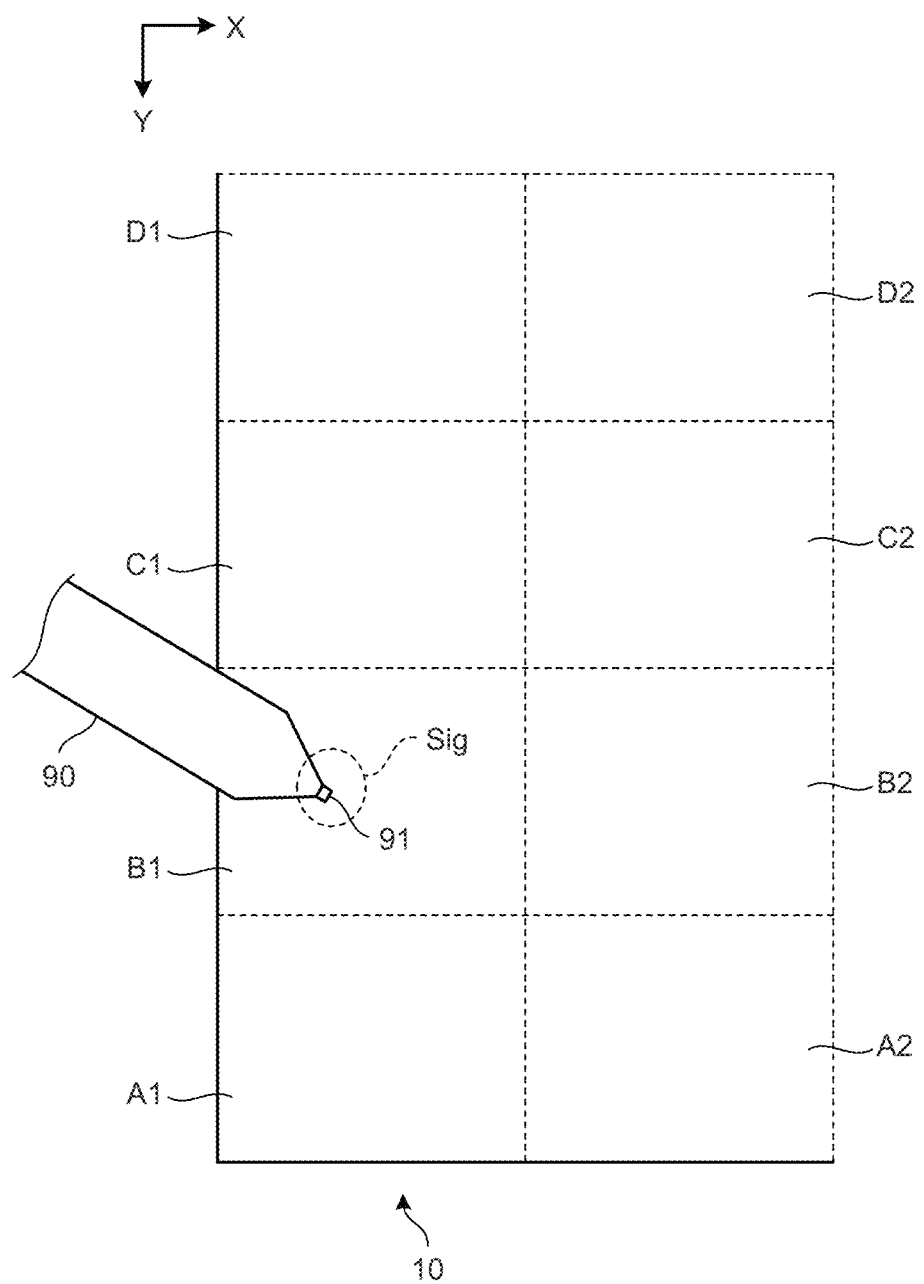
FIG. 20 is a diagram illustrating an example of a case in which palm rejection processing performed by a determination unit is applied to a detection result illustrated in FIG. 19.

FIG. 19 is a schematic diagram illustrating an example of a state in which a touch of the pointing device and a touch of another object are both detected. FIG. 20 is a diagram illustrating an example of a case in which the palm rejection processing performed by the determination unit 80 is applied to the detection result illustrated in FIG. 19. The partial regions illustrated in FIG. 19 and FIG. 20 are the same as the partial regions illustrated in FIG. 18. Assume that, as illustrated in FIG. 19, when the pointing device 90 provides an instruction input to the partial region B1, a signal output Vout indicating not only detection of a touch made by the pointing device 90 but also detection of a touch made at another touch panel coordinates is obtained from the touch detection unit 30. FIG. 19 schematically illustrates an example of a case of obtaining a signal output Vout indicating that touch panel coordinates Sig, touch panel coordinates Pal, and touch panel coordinates Noi are detected at once. The touch panel coordinates Sig indicate a touching position of the pointing device 90. The touch panel coordinates Pal are coordinates detected due to a capacitance caused when a touch is made on the display surface by an object other than the pointing device 90 (for example, a finger of a person) (hereinafter, this touch is also referred to as Palm). The touch panel coordinates Noi are coordinates detected due to noise caused by some reasons (for example, proximity of a piece of cloth).

After determining the partial region indicating the touching position of the pointing device 90 through the determination processing described above, the determination unit 80 performs palm rejection processing for invalidating, among the touch panel coordinates indicated by the signal output Vout, the touch panel coordinates other than the partial region determined to be the touching position of the pointing device 90 through the determination processing. When the signal output Vout indicating the touch panel coordinates Sig, the touch panel coordinates Pal, and the touch panel coordinates Noi illustrated in FIG. 19 is obtained and the palm rejection processing is applied, as illustrated in FIG. 20, the touch panel coordinates Pal detected due to Palm and the touch panel coordinates Noi detected due to noise are invalidated, and only the touch panel coordinates Sig indicating the touching position of the pointing device 90 remain as a valid touch detection result. In this way, among detection results obtained by the detection unit 40, the determination unit 80 invalidates the detection result that does not correspond to the instruction input position determined through the determination processing. Through the palm rejection processing, even when the object other than the pointing device 90 touches the display surface of the display device 10 with a touch detection function, the touch detection system 1 can extract only the instruction input position of the pointing device 90. Thus, an instruction can be input more accurately using the pointing device. For clarity, the touch panel coordinates Sig are illustrated to be larger than the tip of the pointing device 90 in FIG. 19 and the other drawings. However, the touch panel coordinates Sig are actually detected to be smaller. In FIG. 2 and the other drawings, an output indicating the determination result after the palm rejection processing is represented as an output Vfin.

Figure 21:
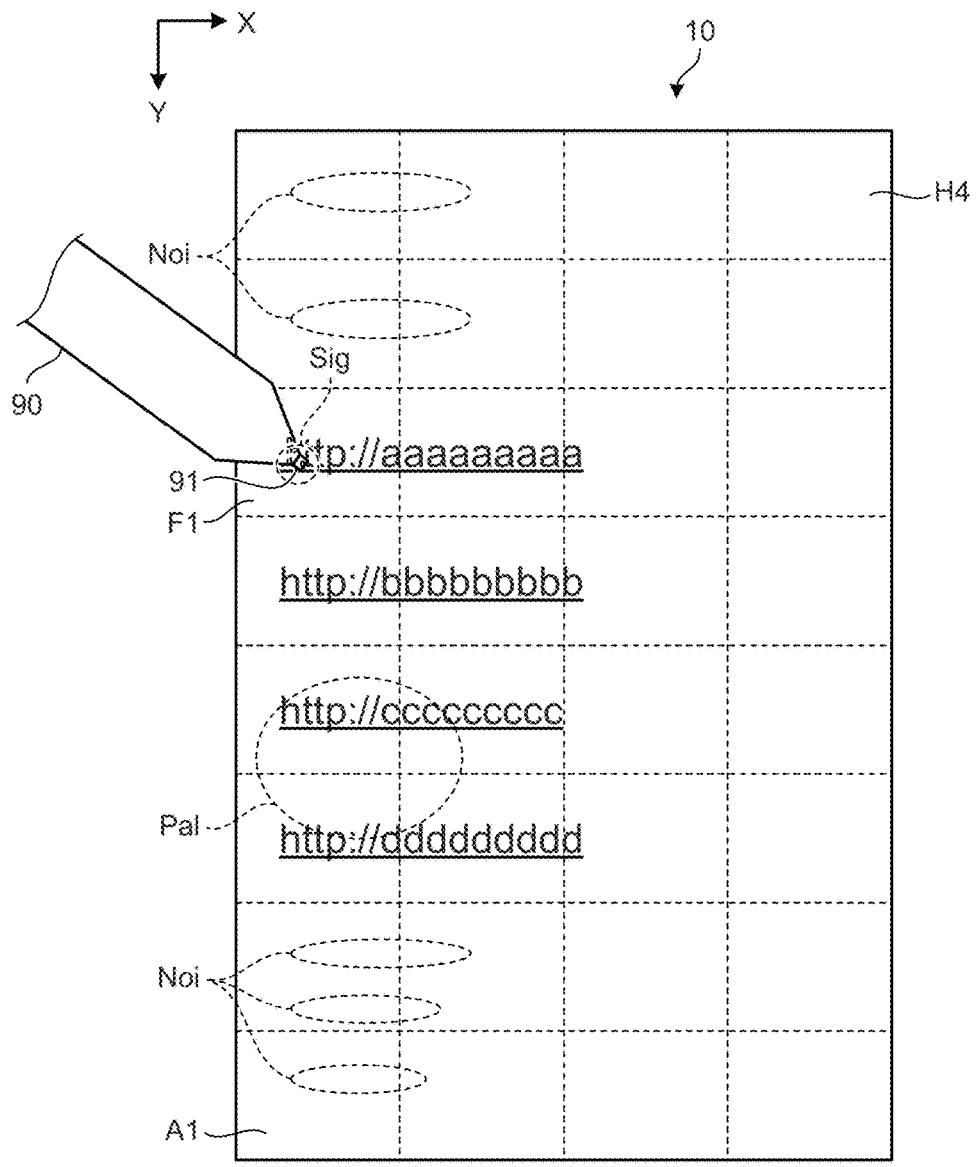
FIG. 21 is a schematic diagram illustrating an example of palm rejection performed by setting a different color for each character string of a hyperlink.

FIG. 21 is a schematic diagram illustrating an example of palm rejection performed by setting a different color for each character string of a hyperlink. For example, as illustrated in FIG. 21, character strings of a plurality of hyperlinks are arranged in different partial regions (for example, a plurality of partial regions arranged along the Y-direction), and colors of the character strings of the respective hyperlinks are caused to be different from each other so that the color sensor 92 can identify the difference. Assume that when the pointing device 90 provides an instruction input to the partial region F1 in which any one of the hyperlinks is displayed and the touch panel coordinates Sig are detected, the touch panel coordinates Pal detected due to Palm or the touch panel coordinates Noi detected due to noise are also included in the detection result. Even in such a case, by performing palm rejection processing, the instruction input to the partial region F1 in FIG. 21 can be determined to be the instruction input by the pointing device 90, and touch detection in the other partial regions can be invalidated. Accordingly, the instruction input for the hyperlink the character string of which is included in the partial region F1 can be determined more accurately by invalidating Palm and/or noise. In the case illustrated in FIG. 21, a plurality of partial regions are not necessarily provided along the X-direction. Alternatively, a set of pixels that display the character string constituting one hyperlink in FIG. 21 may be defined to be one partial region.

Figure 22:
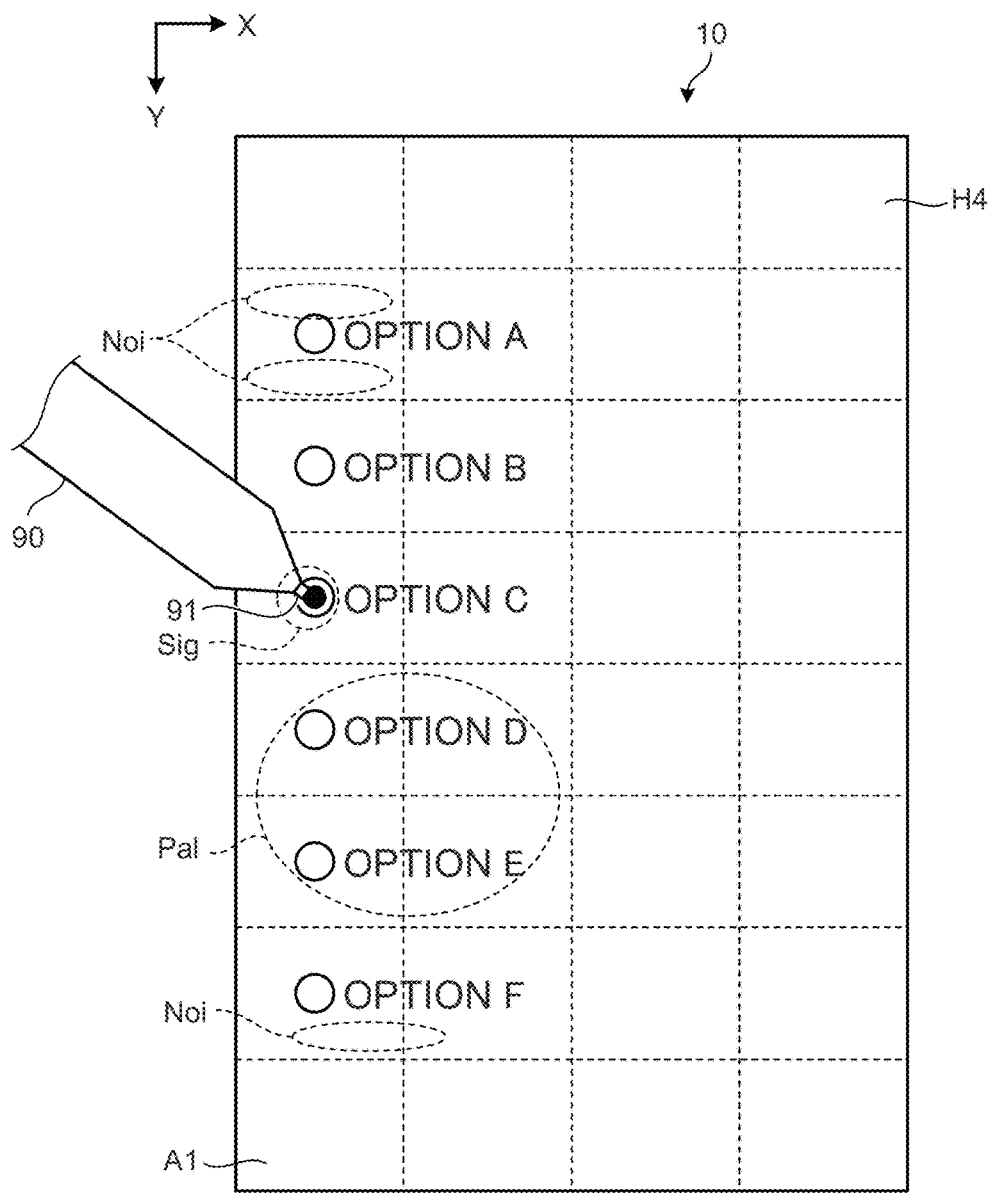
FIG. 22 is a schematic diagram illustrating an example in which the color of the image is changed depending on an instruction input.
Figure 23:
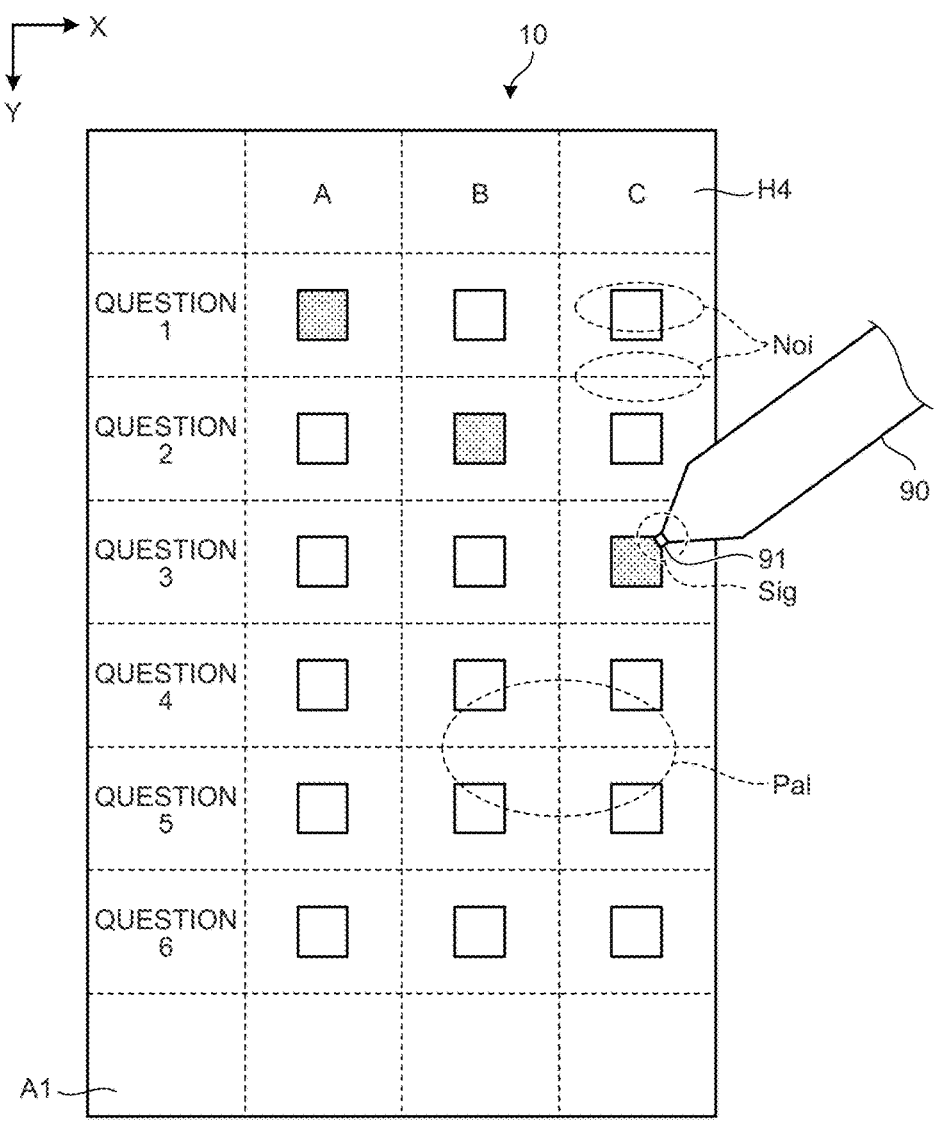
FIG. 23 is a schematic diagram illustrating another example in which the color of the image is changed depending on the instruction input.

In the examples illustrated in FIG. 17 to FIG. 21, the color of the screen is fixed in performing touch detection. That is, display content on the screen is not changed during touch detection, and the display color detected by the color sensor in each of the partial regions is not changed depending on a detection timing. On the other hand, this embodiment can also be applied to a case in which the color of the image is changed depending on the instruction input. With reference to FIG. 22 to FIG. 24, the following describes a case in which the color of the image is changed depending on the instruction input.

FIG. 22 is a schematic diagram illustrating an example in which the color of the image is changed depending on the instruction input. FIG. 23 is a schematic diagram illustrating another example in which the color of the image is changed depending on instruction input. As illustrated in FIG. 22, in a case in which a screen is displayed for selecting one of a plurality of radio buttons through the instruction input by the pointing device 90, the radio buttons are arranged in different partial regions. Accordingly, the instruction input position of the pointing device 90 can be determined more accurately through determination processing and palm rejection processing. Similarly, as illustrated in FIG. 23, also in a case in which a screen is displayed for selecting an arbitrary number of checkboxes from among a plurality of checkboxes through the instruction input by the pointing device 90, the instruction input position of the pointing device 90 can be determined more accurately by arranging the checkboxes in different partial regions.

FIG. 24 is a diagram illustrating an example of a correspondence relation between the colors before and after selecting the radio button and the checkbox. In a circle region of the radio button in FIG. 22, display of an image (a solid circle) indicating a check result in the button is switched before and after the selection through the instruction input. Thus, as illustrated in FIG. 24, by setting the color before the selection (background color) and the color after the selection (the color of the image of the solid circle) to be different for each of the partial regions, the instruction input position of the pointing device 90 can be collated with the partial regions regardless of whether the selection has been already performed. In FIG. 24, the color before the selection is a color close to white similarly to the example of FIG. 16, and the color after the selection is a color close to black. However, these colors can be appropriately modified. The setting of colors before and after the instruction input as illustrated in FIG. 24 can be applied not only to the radio button but also to other display content that is changed before and after the instruction input such as the checkbox illustrated in FIG. 23.

Figure 25:
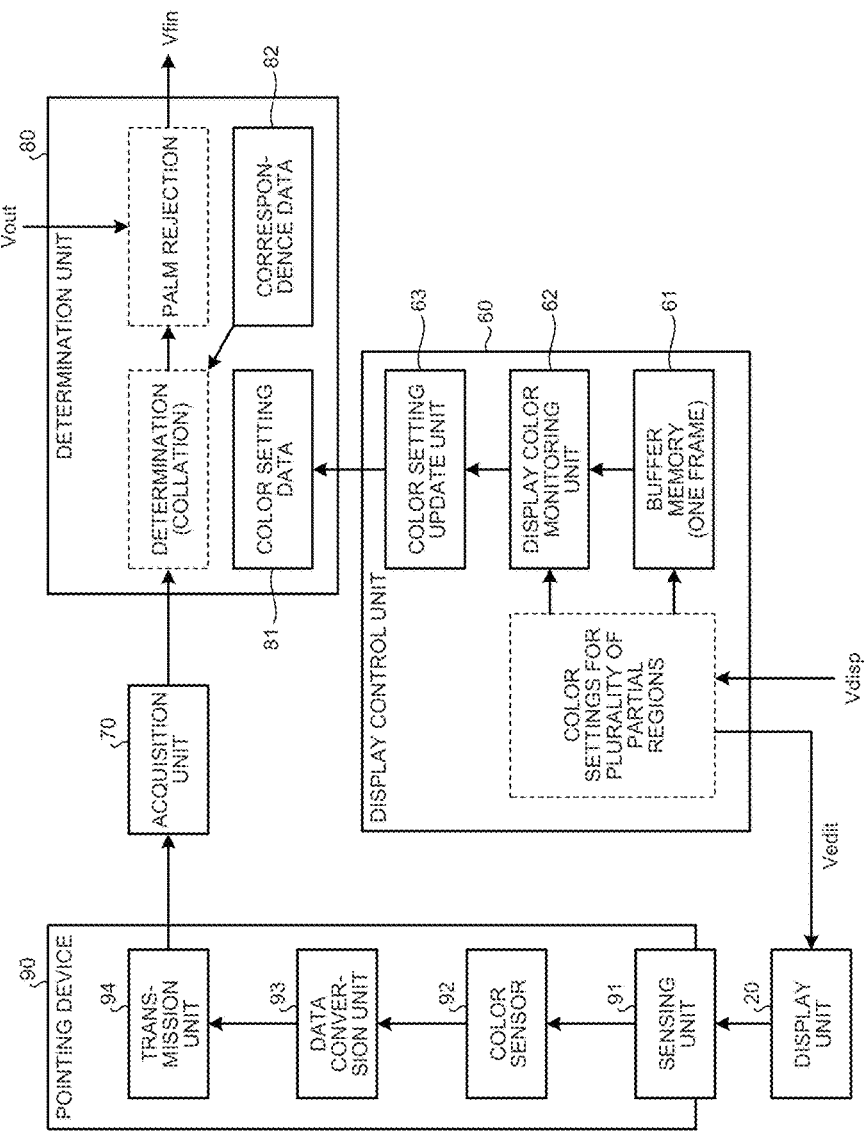
FIG. 25 is a diagram illustrating an example of a relation between various pieces of processing related to determination of the instruction input position by the pointing device in the touch detection system.

FIG. 25 is a diagram illustrating an example of a relation between various pieces of processing related to determination of the instruction input position by the pointing device 90 in the touch detection system 1. As illustrated in FIG. 24, in a case of performing display in which the color is changed depending on the instruction input, the display device 10 with a touch detection function performs processing for updating, depending on the display content, information on the color of each of the partial regions among pieces of information used in the determination processing. A specific example of the update processing is that display content indicated by the video signal Vdisp is buffered for one frame, a change in the display color between continuous two frames is monitored, and when a change in the display color is found, color settings for a plurality of partial regions used for collation may be updated. In the example illustrated in FIG. 25, a display color monitoring unit 62 in the display control unit 60 monitors the change in the display color, and a color setting update unit 63 updates the color setting. Alternatively, the display color monitoring unit 62, the color setting update unit 63, and a buffer memory 61 for buffering may be included in the display control unit 60, or may be independent of each other.

In the example illustrated in FIG. 18, the gradation values of the display color are directly detected by the color sensor 92 because this description aims for clarity. The gradation values themselves of the display color may not be detected as a detection result.

FIG. 26 is a diagram illustrating an example of a relation between the brightness of the screen and the detection result of the display color obtained by the color sensor 92. As illustrated in FIG. 26, the color detected by the color sensor 92 varies depending on the brightness of the screen even if the same display content is displayed in the same partial region. In FIG. 26, exemplified are the detection results of the partial regions A1 to A4 corresponding to two different levels of brightness of the screen (brightness 1, brightness 2). Similarly, for each of the other partial regions, the detection result is different depending on the brightness. In FIG. 26, a display output with brightness 2 is brighter than that with brightness 1. Similarly, even if the brightness of the screen can be adjusted in three or more levels, the detection result is different depending on the brightness of the screen. FIG. 26 illustrates an example in which the color sensor 92 outputs the detection result with the gradation values of R, G, and B. However, this is merely an example of output content of the color sensor 92, and the embodiment is not limited thereto.

As described above with reference to FIG. 26, the detection result obtained by the color sensor 92 can be changed depending on the brightness of the screen. Thus, the display device 10 with a touch detection function according to the embodiment performs processing for associating the detection result obtained by the color sensor 92 with the display color (calibration processing).

Figure 27:
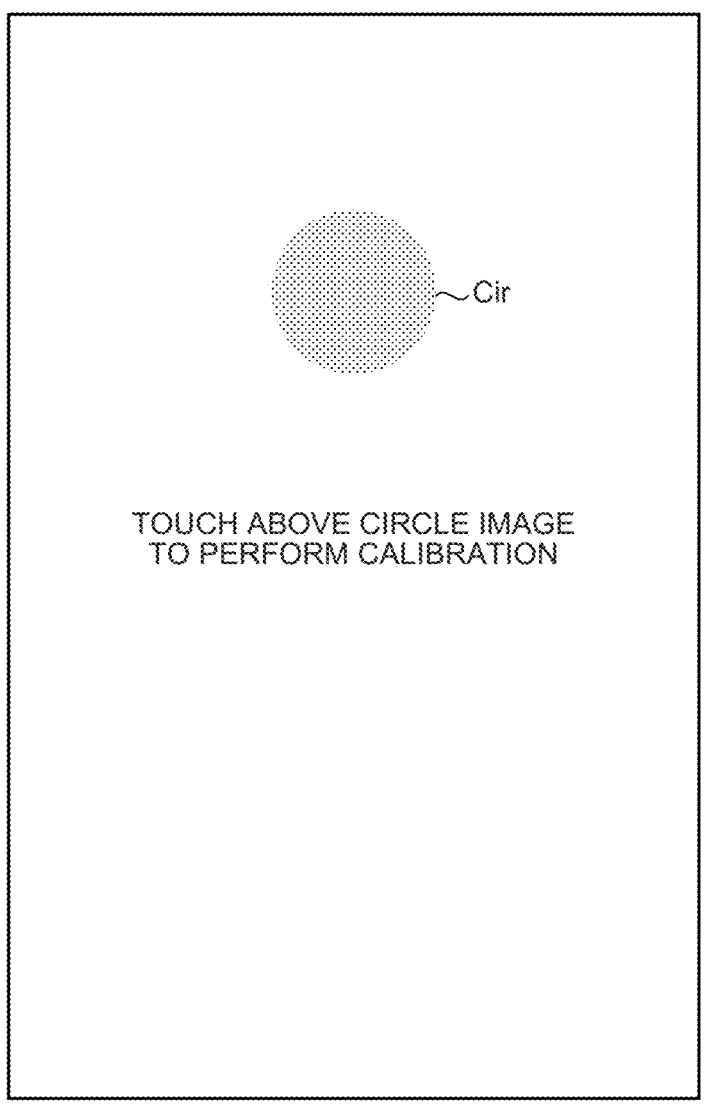
FIG. 27 is a diagram illustrating an example of a calibration screen.

FIG. 27 is a diagram illustrating an example of a calibration screen. The display color of a circle image Cir in the calibration screen illustrated in FIG. 27 is a predetermined color (for example, RGB=(128, 128, 128)). In calibration processing, the display control unit 60 controls the display unit 20 to display the calibration screen as illustrated in FIG. 27, for example. When the pointing device 90 provides an instruction input to the display position of the circle image Cir, the color sensor 92 of the pointing device 90 detects the display color of the circle image Cir, and the transmission unit 94 transmits information indicating the display color. The acquisition unit 70 of the display device 10 with a touch detection function acquires the information. The display device 10 with a touch detection function associates the color indicated by the information with the color of the circle image Cir. Specifically, as illustrated in FIG. 25 for example, the determination unit 80 includes a memory for storing and holding correspondence data 82 indicating a relation between the color of the circle image Cir displayed on the calibration screen and the detection result of the display color of the circle image Cir obtained by the color sensor 92. The determination unit 80 refers to the correspondence data 82 in performing determination processing and performs processing for identifying the color of the image indicated by the color detected by the color sensor 92. The determination unit 80 collates the identified color with the color of each partial region, and determines the instruction input position of the pointing device 90.

Specific content of processing for identifying "a relation between the color indicated by the detection result obtained by the color sensor 92 in determination processing and the color of another image" based on "the relation between the color indicated by the detection result obtained by the color sensor 92 and the color of the circle image Cir" indicated by the correspondence data 82 is determined in advance. For example, the determination unit 80 can perform such processing by measuring "the detection result of another color in a case in which the color of the circle image Cir is detected with a certain RGB gradation value by the color sensor 92" in advance, and including an algorithm or data indicating "a relation between the detection result and the color of the image" based on the measurement result into the determination unit 80. A specific method for implementing such processing can be appropriately modified.

In the example illustrated in FIG. 27, the display content includes a message for prompting the user to provide an instruction input to the circle image Cir with the pointing device 90. Alternatively, a notification corresponding to such display content may be given by another screen before displaying the calibration screen, or given by a voice and the like using a voice device (not illustrated) included in an electronic apparatus to which the display device 10 with a touch detection function is provided (for example, an electronic apparatus 200 illustrated in FIG. 30).

Figure 28:
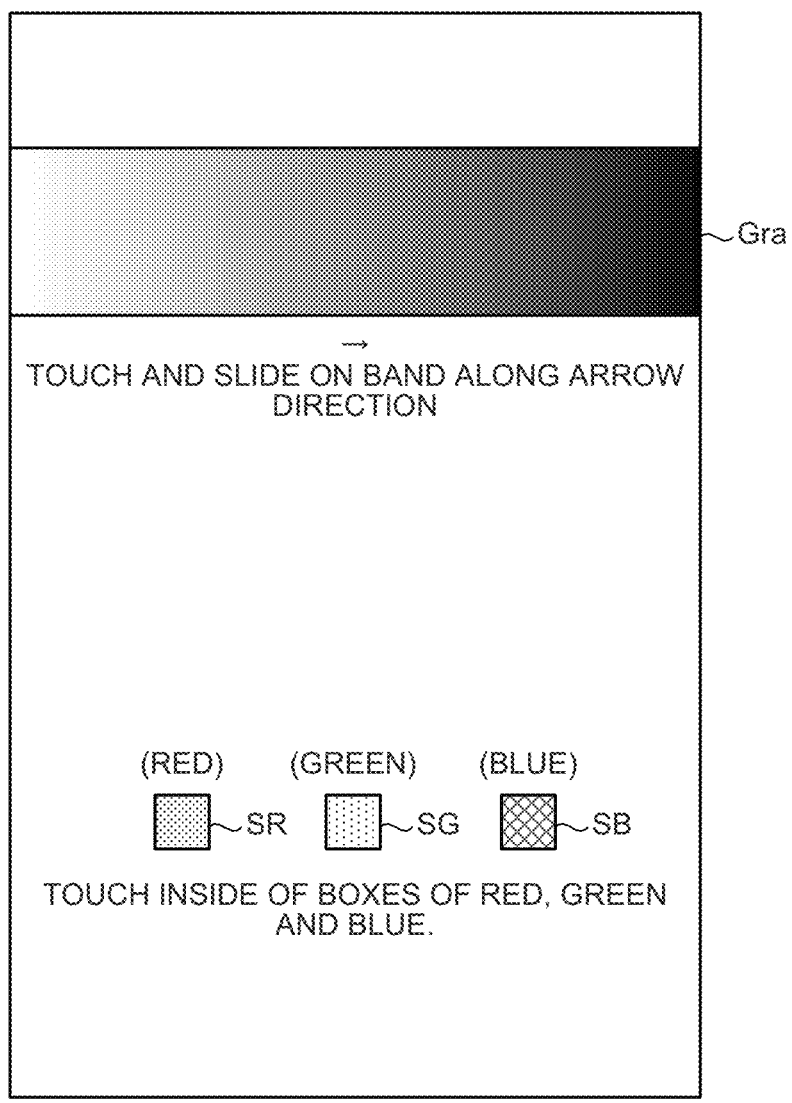
FIG. 28 is a diagram illustrating another example of the calibration screen.
Figure 29:
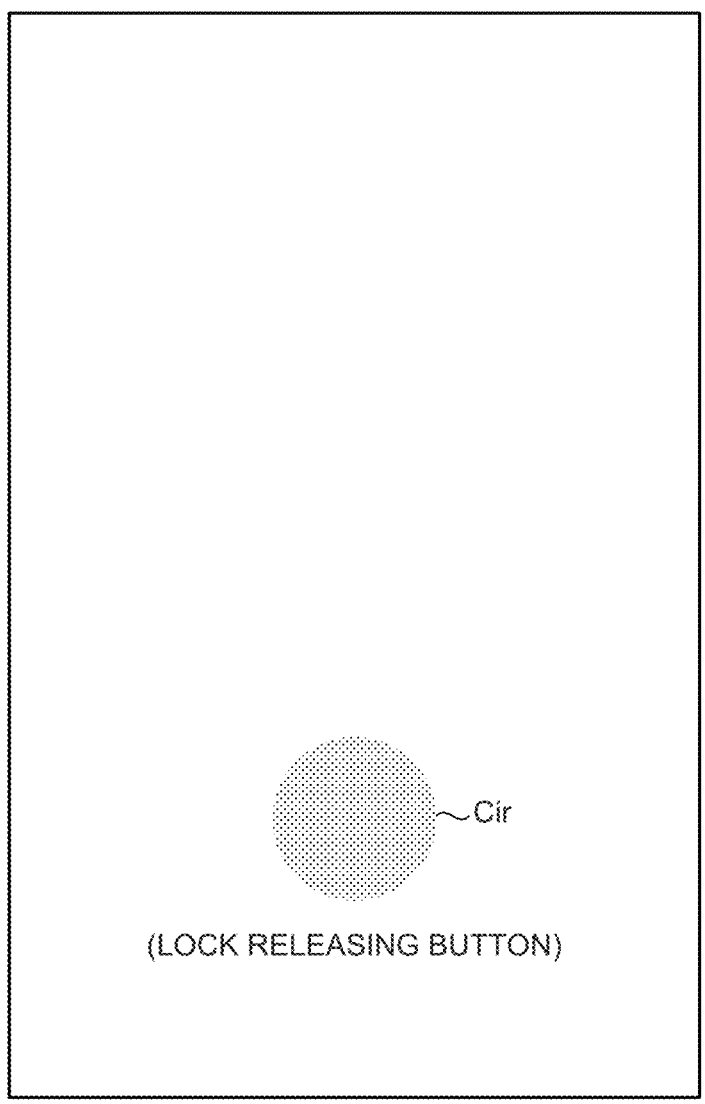
FIG. 29 is a diagram illustrating another example of the calibration screen.

FIG. 28 and FIG. 29 are each a diagram illustrating another example of the calibration screen. The image used for calibration processing may be an image other than the circle image Cir, and can be appropriately modified. For example, as illustrated in FIG. 28, a gradation region Gra in which the display color is gradually changed along one direction (for example, the X-direction) may be displayed in the calibration screen, and the user may be prompted to provide an instruction input by touching the gradation region Gra with the pointing device 90 to be moved therealong. In this case, detection results can be obtained by the color sensor 92 for a plurality of display colors, so that accuracy of the relation between the detection result and the color of the image can be further improved. Alternatively, display regions SR, SG, and SB that individually display predetermined colors such as red (R), green (G), and blue (B) may be arranged in the calibration screen, and the user may be prompted to individually touch the display regions with the pointing device 90. The predetermined colors can be appropriately modified.

FIG. 27 and FIG. 28 illustrate a dedicated screen as the calibration screen. Alternatively, another screen may be used to perform calibration processing. For example, as illustrated in FIG. 29, an image similar to the circle image Cir may be displayed as a lock releasing button of a portable terminal (for example, a smartphone), and the calibration processing may be performed at a timing when a user of the portable terminal performs lock releasing operation with the pointing device 90. In the calibration screen, control of the display color for each partial region is not required.

Figure 30:
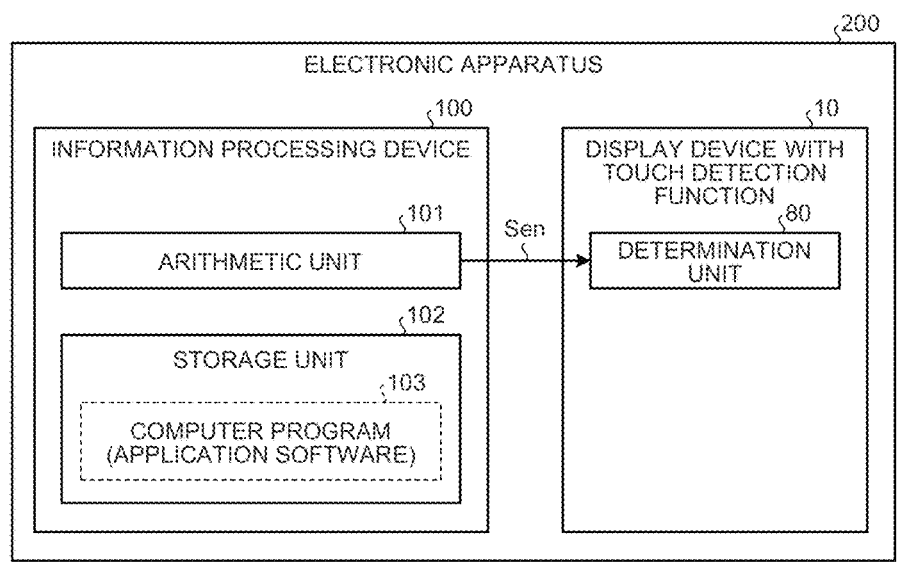
FIG. 30 is a diagram illustrating an example of a relation between the display device and an information processing device that executes application software.

FIG. 30 is a diagram illustrating an example of a relation between an information processing device that executes application software and the display device 10 with a touch detection function. An input to the display device 10 with a touch detection function is not limited to the instruction input using the pointing device 90. For example, the display device 10 with a touch detection function can receive an instruction input through a multi-touch operation and the like using a plurality of fingers. The type of the instruction input received by the display device 10 with a touch detection function can be freely determined. In this embodiment, the electronic apparatus 200 includes an information processing device 100 and the display device 10 with a touch detection function. The information processing device 100 includes an arithmetic unit 101 and a storage unit 102. The storage unit 102 stores a computer program 103. Application software that enables the arithmetic unit 101 to read out the computer program 103 stored in the storage unit 102 and execute the computer program 103 is associated with an instruction input method used for executing the application software. The information processing device 100 outputs a command Sen indicating that a method for providing an instruction input with the pointing device 90 is employed as the instruction input method. The determination unit 80 of the display device 10 with a touch detection function operates in a stylus mode according to the command Sen. The stylus mode is a mode of detecting the instruction input by the pointing device 90 and invalidating a touch of another object through palm rejection processing.

Figure 31:
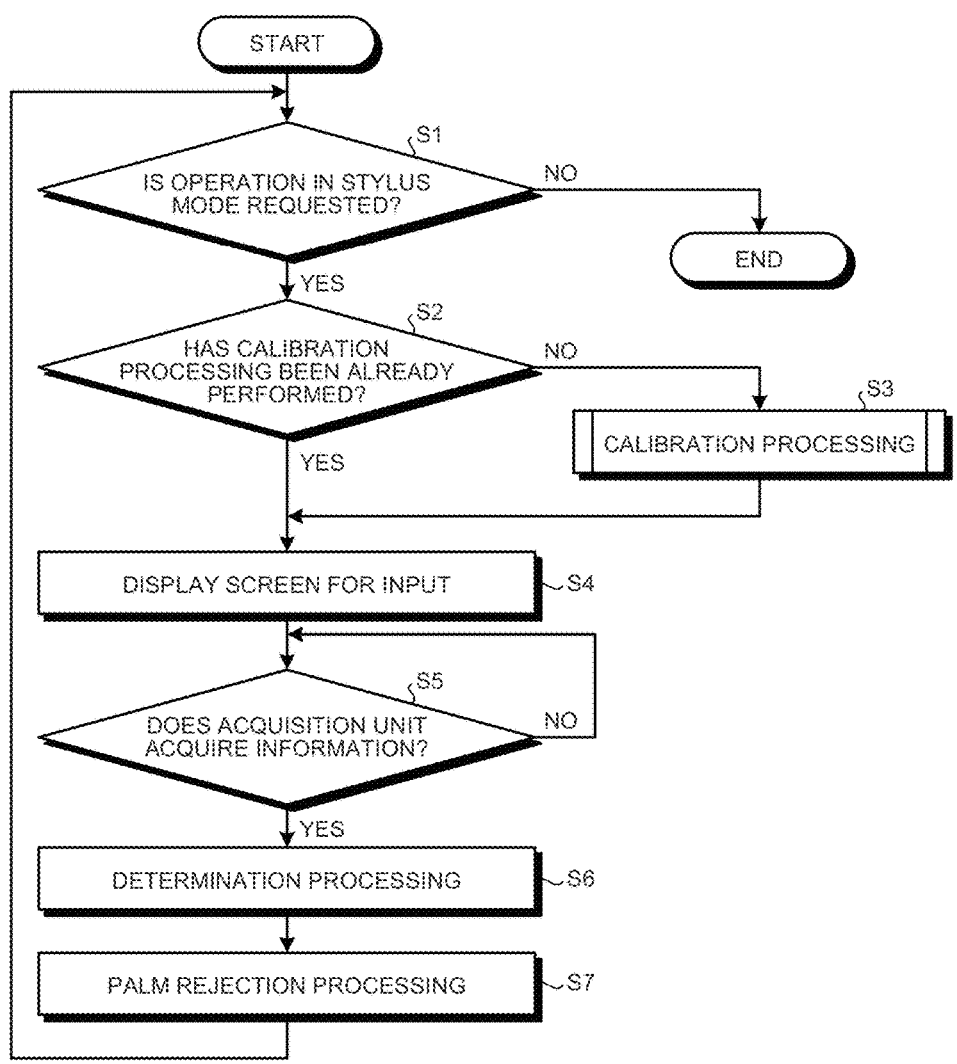
FIG. 31 is a flowchart illustrating an example of a processing procedure according to a stylus mode.

FIG. 31 is a flowchart illustrating an example of a processing procedure according to the stylus mode. The control unit 11 determines whether the command Sen to request an operation in the stylus mode is present (Step S1).

If it is determined that the command Sen to request the operation in the stylus mode is not present or the command Sen is terminated (No at Step S1), the control unit 11 ends the processing according to the stylus mode.

If it is determined that the command Sen to request the operation in the stylus mode is present (Yes at Step S1), the determination unit 80 determines whether the calibration processing has been already performed (Step S2). In Step S2, the determination unit 80 may determine whether the calibration processing has been already performed with the brightness of the screen employed at that time, for example. If the calibration processing is not performed yet (No at Step S2), the process proceeds to the calibration processing (Step S3).

Figure 32:
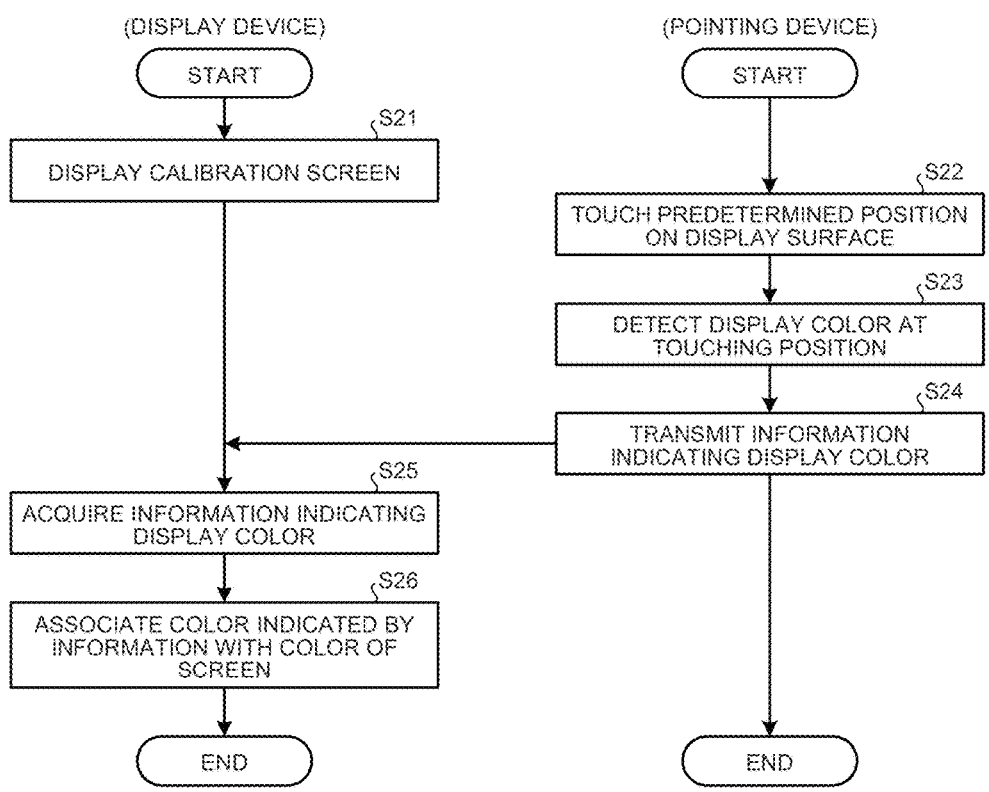
FIG. 32 is a flowchart illustrating an example of a procedure of a calibration processing.

FIG. 32 is a flowchart illustrating an example of a procedure of calibration processing. The display control unit 60 causes the calibration screen (for example, refer to FIG. 27, FIG. 28, or FIG. 29) to be displayed (Step S21). The pointing device 90 touches a predetermined position on the display surface through an operation by the user (Step S22). The predetermined position on the display surface may be a position on the calibration screen to which an instruction input is suggested to be provided such as the display region including the circle image Cir, for example. The color sensor 92 of the pointing device 90 detects the display color at the position where a touch is made at Step S22 (Step S23). The transmission unit 94 of the pointing device 90 transmits information indicating the display color detected at Step S23 (Step S24). The acquisition unit 70 of the display device 10 with a touch detection function acquires the information transmitted at Step S24 (Step S25). The determination unit 80 associates the color indicated by the information acquired at Step S25 with the color of the screen on the calibration screen (Step S26), and ends the calibration processing. The color of the screen to be associated with the color indicated by the information may be represented by an output gradation value of a pixel region corresponding to the position on the calibration screen to which an instruction input is suggested to be provided.

Although not illustrated in the processing procedure of FIG. 32, when a difference between the color indicated by the information acquired at Step S25 and the display color exceeds a predetermined threshold in the processing at Step S26, the calibration processing may be performed again. Specifically, for example, when the touching position of the pointing device 90 is an erroneous touching position at the time when the calibration screen is displayed, intended color collation cannot be performed in the calibration processing. The erroneous touching position is a position other than the position to which an instruction input is suggested to be provided. In this case, the display control unit 60 may redisplay the calibration screen including a notification suggesting that an instruction input is provided to a correct position. In this case, the determination unit 80 cancels the association and associates the colors again when an instruction input is provided to the correct position.

After the calibration processing is ended or if it is determined that the calibration processing has been already performed at Step S2 (Yes at Step S2), the display control unit 60 controls the display unit 20 to display a screen (a screen for input) in which the color of the image is set so that displayed colors are different for each of the partial regions (Step S4). Thereafter, the display control unit 60 stands by until the acquisition unit 70 acquires the information transmitted from the transmission unit 94 of the pointing device 90 (No at Step S5). An operation of the pointing device 90 for detection of the color indicated by the information acquired by the acquisition unit 70 is similar to the processing at Step S23 and Step S24 in FIG. 32, so that detailed description thereof will not be repeated. If the acquisition unit 70 acquires the information transmitted from the transmission unit 94 of the pointing device 90 (Yes at Step S5), the determination unit 80 performs determination processing based on the color of the screen for input and based on the color indicated by the information acquired by the acquisition unit 70 (Step S6), and determines the partial region corresponding to the touching position of the pointing device 90. The determination unit 80 performs palm rejection processing for invalidating, among the touch panel coordinates indicated by the signal output Vout, the touch panel coordinates other than the partial region determined to be the touching position of the pointing device 90 through the determination processing (Step S7), and the process proceeds to Step S1.

As described above, in the touch detection system 1 according to the embodiment, the display device 10 with a touch detection function includes the display unit 20 that displays an image, the touch detection unit 30 that detects an instruction input provided by the pointing device 90 to the display surface of the display unit 20, the acquisition unit 70 that acquires information indicating the display color at the instruction input position detected by the color sensor 92 included in the pointing device 90, and the determination unit 80 that performs determination processing to determine the instruction input position based on the color of the image and the color indicated by the information acquired by the acquisition unit 70. Accordingly, when the instruction input provided by the pointing device 90 is detected by the touch detection unit 30, the instruction input position can be identified based on the instruction input position detected by the touch detection unit 30 and based on the instruction input position that is determined based on the display color at the instruction input position and the color of the image. Thus, even if proximity or a touch of an object other than the pointing device 90 is detected when the instruction input provided by the pointing device 90 is detected by the touch detection unit 30, the instruction input from the pointing device 90 can be detected more securely. This configuration can further reduce erroneous detection of the input caused by a touch (proximity or contact) of an object other than the pointing device 90 on the display surface.

In the determination processing, the determination unit 80 collates the color of the image set to be different for each of the partial regions with the color indicated by the information acquired by the acquisition unit 70. The partial regions constitute the display region of the display unit 20. Due to this, the instruction input position of the pointing device 90 can be associated with the position of the partial region in the display region of the display unit 20, so that the instruction input position of the pointing device 90 can be identified with higher accuracy.

The touch detection unit 30 includes the drive electrode COML, the touch detection electrode TDL opposed to at least part of the drive electrode COML with the dielectric interposed therebetween, and the detection unit that detects an instruction input based on the detection signal generated in the touch detection electrode TDL in accordance with the drive signal applied to the drive electrode COML. The determination unit 80 invalidates, among the detection results obtained by the detection unit, the detection result that does not correspond to the instruction input position determined through the determination processing. Due to this, even if a touch of an object other than the pointing device 90 is detected when the instruction input of the pointing device 90 is detected by the touch detection unit 30, the detected touch of the object other than the pointing device 90 can be invalidated, so that the instruction input of the pointing device 90 can be detected more securely. This configuration can further reduce erroneous detection of the input due to the touch of the object other than the pointing device 90 on the display surface.

The color of the image is fixed, so that the determination processing can be further simplified.

When the image having a fixed color serves as the calibration image for associating the display color with the detection result obtained by the color sensor 92, accuracy of the determination through the determination processing can be further improved due to the association using the calibration image even when there is a factor by which the detection result of the color sensor 92 is changed, such as the brightness of the screen.

The color of the image is changed depending on the instruction input, and the determination unit 80 performs determination processing based on the color of the image before and after the change depending on the instruction input. With this configuration, the instruction input of the pointing device 90 can be detected more securely even when the color of the image is changed depending on the instruction input. This configuration can further reduce erroneous detection of the input caused by the touch of the object other than the pointing device 90 on the display surface.

Modification

The following describes a modification of the present invention. In the description of the modification, the same component and processing as those in the above embodiment are denoted by the same reference numerals, and description thereof will not be repeated in some cases.

Figure 33:
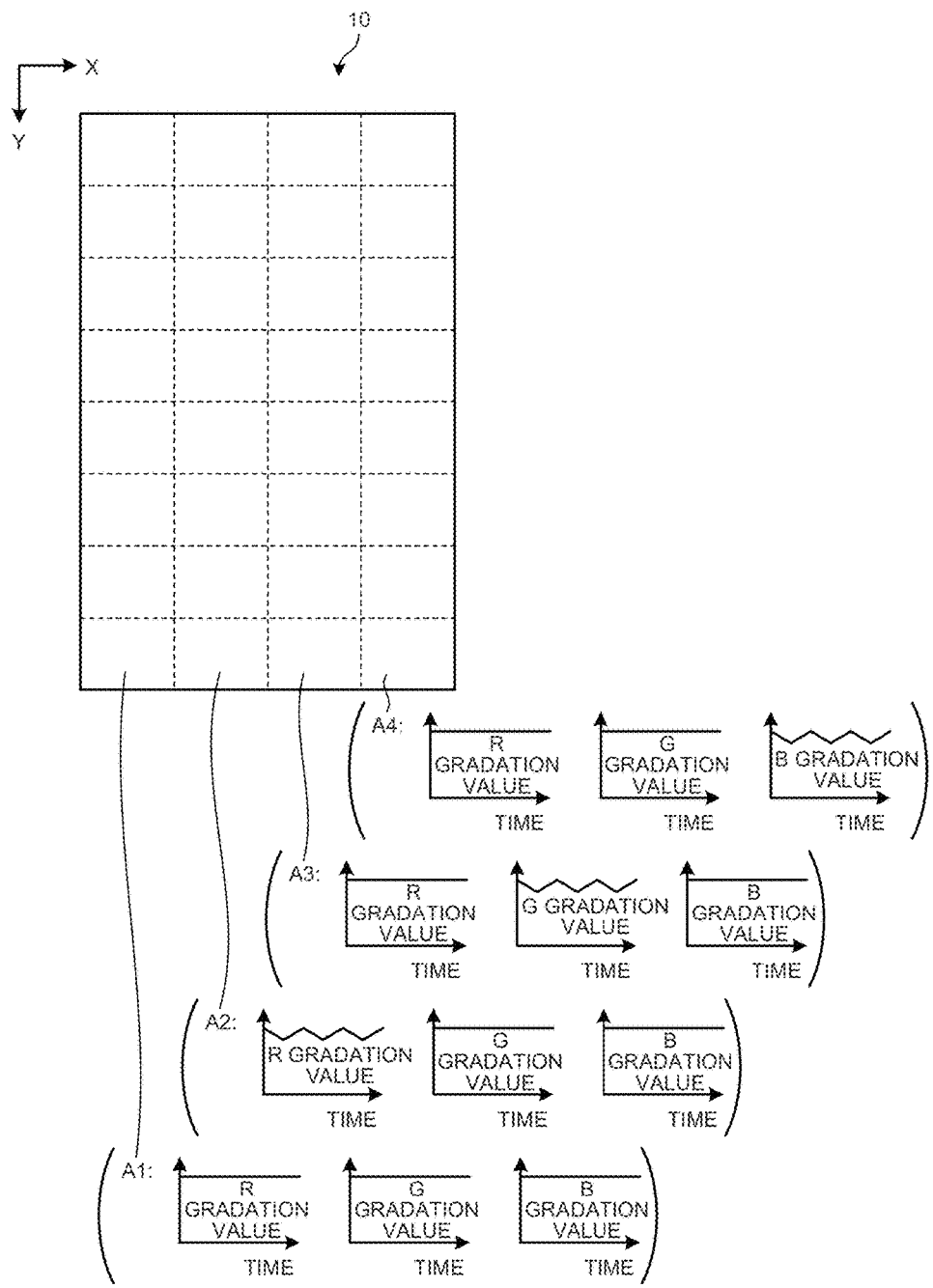
FIG. 33 is an image drawing illustrating an example of a difference in color change for each partial region according to a modification.

FIG. 33 is an image drawing illustrating an example of a difference in color change for each partial region according to the modification. FIG. 34 is a diagram illustrating an example in which the difference in color change for each partial region is represented by a numerical value. In the modification, a change pattern of the color of the image is different for each of the partial regions. Specifically, as illustrated in FIG. 33 and FIG. 34 for example, the display control unit 60 according to the modification controls display content of the screen for input so that the change pattern of the color at predetermined cycles is different for each of the partial regions. FIG. 33 and FIG. 34 illustrate an example in which the gradation value of R among the gradation values of R, G, and B varies at predetermined cycles in the partial region A2, the gradation value of G among gradation values of R, G, and B varies at predetermined cycles in the partial region A3, and the gradation value of B among the gradation values of R, G, and B varies at predetermined cycles in the partial region A4. However, this is merely an example, and the modification is not limited thereto. The modification can be appropriately modified. For other partial regions the color change amount of which is not illustrated, display control is performed so that the gradation values vary differently for each of the partial regions. The display control unit 60 controls display output content in accordance with a variation range of the color of the image that is determined in advance for each of the partial regions. The variation range of the color of the image determined in advance is different for each of the partial regions. The partial region the color change amount of which is zero, such as the partial region A1 in FIG. 33 and FIG. 34, may be included in the display region. A plurality of gradation values (for example, R and G) among the gradation values of R, G, and B may be changed in the same manner as the partial region B1 in FIG. 34.

The color sensor 92 of the pointing device 90 according to the modification takes a time equal to or longer than a predetermined cycle to detect the variation of the display color. That is, the color sensor 92 detects the variation range of the display color. The acquisition unit 70 successively transmits pieces of information indicating the display color detected by the color sensor 92. The acquisition unit 70 of the display device 10 with a touch detection function successively acquires the pieces of information that are successively transmitted, so that the acquisition unit 70 acquires the information indicating the variation range of the display color. The determination unit 80 collates the information indicating the variation range of the display color with the variation range of the color of the image determined in advance for each of the partial regions in the determination processing, so that the determination unit 80 determines the instruction input position. The palm rejection processing and the calibration processing after determining the instruction input position are performed in the same manner as those in the above embodiment. However, in the modification, the color of the image such as the circle image Cir on the calibration screen for suggesting that an instruction input is provided in the calibration processing is changed at predetermined cycles similarly to the example illustrated in FIG. 33 and FIG. 34. The determination unit 80 according to the modification associates the color detected by the color sensor 92 of the pointing device 90 with the color of the circle image Cir and the like, and also associates the variation range of the color detected by the color sensor 92 with the variation range controlled by the display control unit 60. The predetermined cycle at which the color of the image is changed can be freely determined. For example, the predetermined cycle is preferably determined based on time resolution (fps) of detection performed by the color sensor 92. The cycle at which the color of the image is changed is not necessarily the same for each of the partial regions. For example, the cycle at which the color is changed may be different for each of the partial regions.

Figure 35:
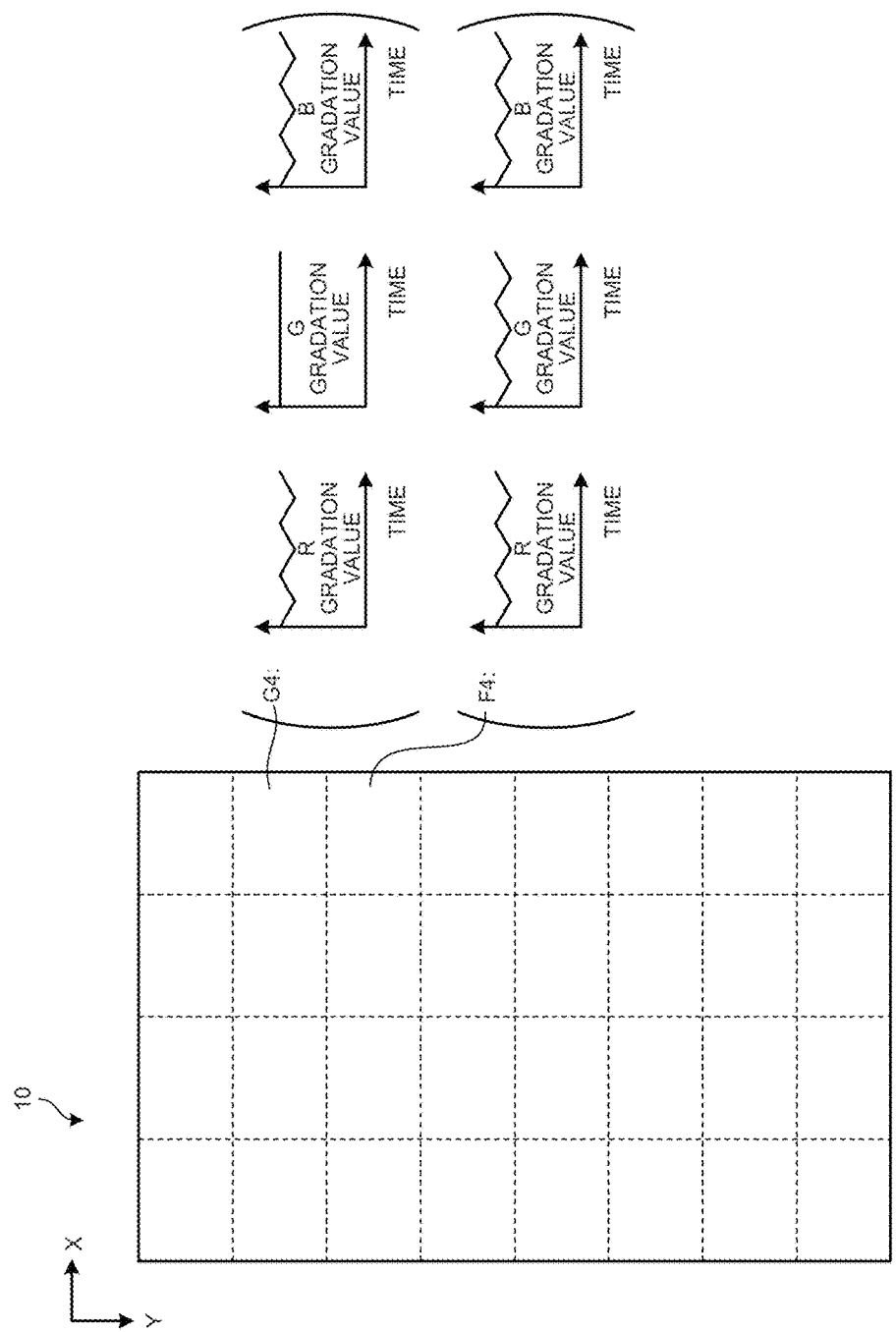
FIG. 35 is a diagram illustrating a display example before a user starts inputting an instruction with the pointing device.
Figure 36:
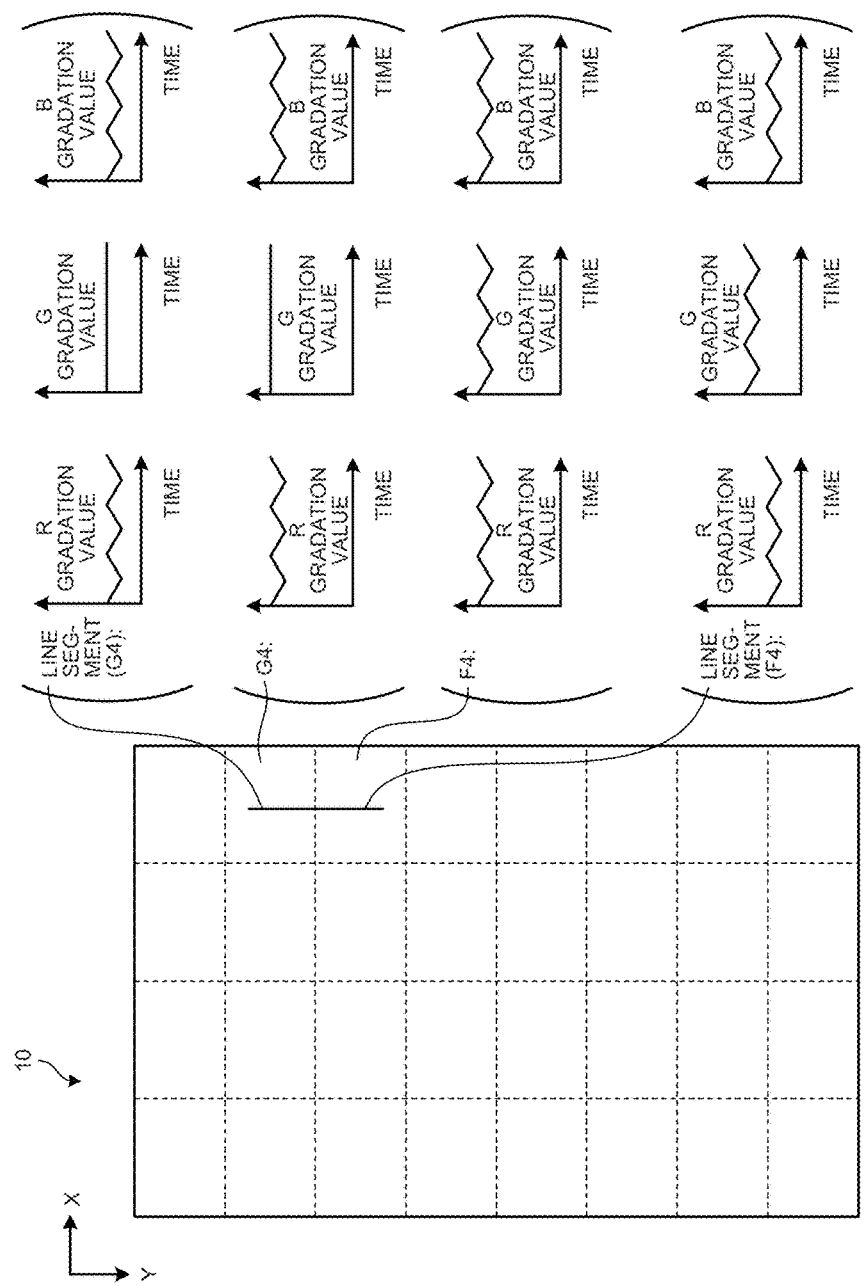
FIG. 36 is a diagram illustrating a display example in which content of the instruction input by the pointing device is reflected.

FIG. 35 is a diagram illustrating a display example before a user starts inputting an instruction with the pointing device 90. FIG. 36 is a diagram illustrating a display example in which content of the instruction input by the pointing device 90 is reflected. FIG. 36 illustrates an example of a case of providing an instruction input for drawing a gray line segment on an input screen the color of which is white as illustrated in FIG. 35. As illustrated in FIG. 36, display control is performed on the gray line segment drawn by the instruction input so that the color of the segment is changed differently for each partial region. In this way, when the display content is changed depending on the instruction input in the modification, the change pattern of the color is caused to be different for each of the partial regions before and after the change. FIG. 35 and FIG. 36 illustrate a case in which the gray line segment is drawn across the partial regions F4 and G4. However, this is merely an example of a case in which the display content is changed depending on the content of the instruction input, and the modification is not limited thereto. The same processing can be applied to another kind of change.

Figure 37:
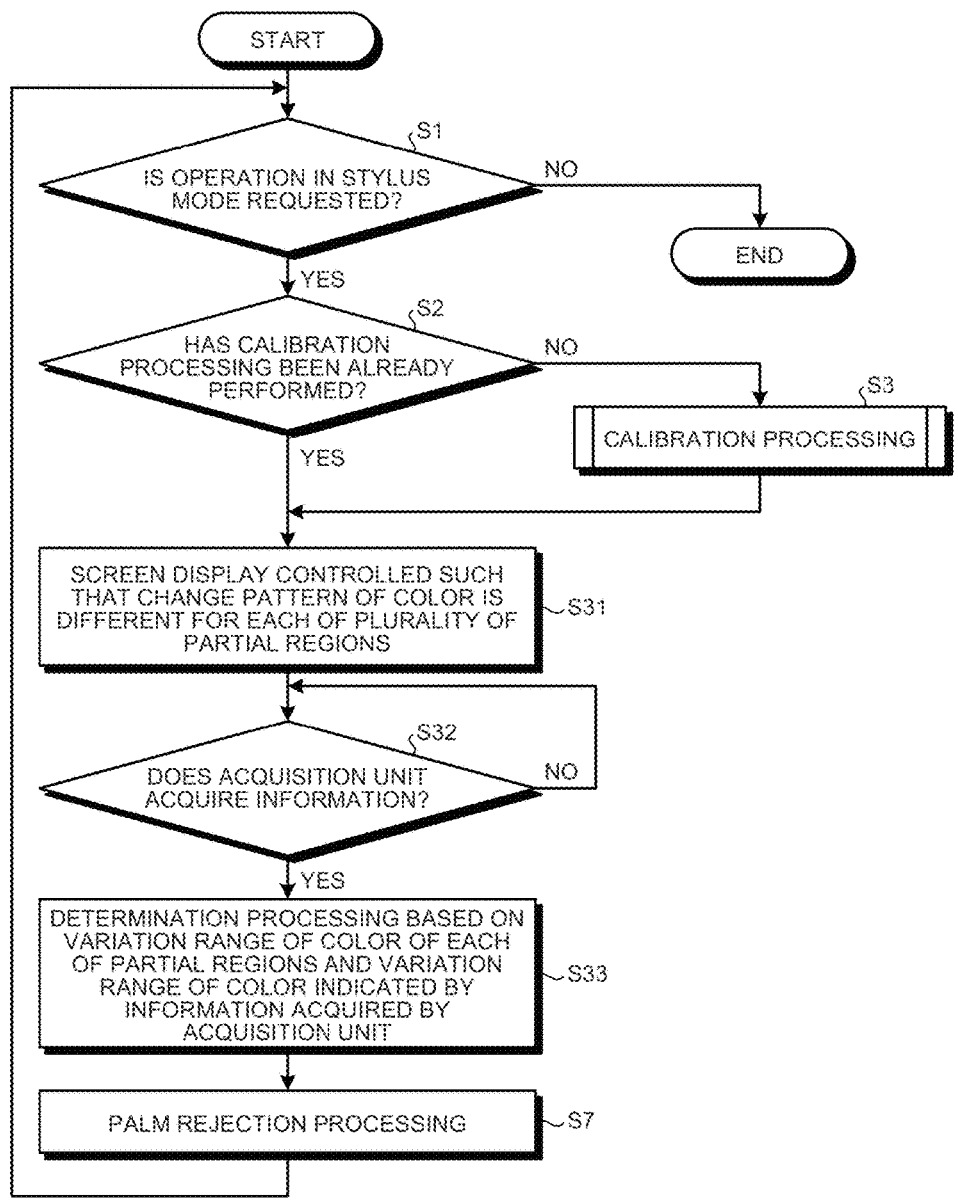
FIG. 37 is a flowchart illustrating an example of a processing procedure related to a stylus mode according to the modification.

FIG. 37 is a flowchart illustrating an example of a processing procedure related to the stylus mode according to the modification. In the flowchart illustrated in FIG. 37, Step S4 to Step S6 in the flowchart illustrated in FIG. 31 are replaced with Step S31 to Step S33. The following describes Step S31 to Step S33.

The display control unit 60 controls the display unit 20 to display a screen controlled so that the change pattern of the color is different for each of the partial regions (Step S31). Thereafter, the display control unit 60 stands by until the acquisition unit 70 acquires the information transmitted from the transmission unit 94 of the pointing device 90 (No at Step S32). If the acquisition unit 70 acquires the information transmitted from the transmission unit 94 of the pointing device 90 (Yes at Step S32), the determination unit 80 performs determination processing based on the variation range of the color of each of the partial regions in the display content at Step S31 and based on the variation range of the color indicated by the information acquired by the acquisition unit 70 (Step S33), and determines the touch panel coordinates Sig indicating a contact position of the pointing device 90.

As described above, the change pattern of the color of the image according to the modification is different for each of the partial regions. Due to this, color patterns for identifying each of the partial regions can be increased. Even when the partial regions are further fractionated, the partial regions can be identified based on a difference between the change patterns of the color, so that a color difference between the partial regions the color difference of which is the largest in the display region can be reduced as compared with a case of identifying the partial regions only with a difference between fixed colors.

The present invention naturally encompasses other working effects caused by the aspects described in the above embodiment that are obvious from the description herein or that can be appropriately conceivable by those skilled in the art.

What is claimed is:

1. A display device comprising:
   a display unit that displays an image;
   a touch detection circuit configured to detect an instruction input provided by a pointing device to a display surface of the display unit, wherein the touch detection circuit includes a drive electrode, a touch detection electrode opposed to at least part of the drive electrode with a dielectric interposed therebetween, and a detection circuit configured to detect the instruction input based on a detection signal generated in the touch detection electrode in accordance with a drive signal applied to the drive electrode;
   an acquisition circuit configured to acquire information indicating a display color at an instruction input position, the display color being detected by a color sensor included in the pointing device; and
   a determination circuit configured to perform determination processing to determine the instruction input position based on a color of the image and the color indicated by the information acquired by the acquisition circuit,
   wherein the determination circuit is configured to collate a color of the image set to be different for each of a plurality of partial regions constituting a display region of the display unit with the color indicated by the information acquired by the acquisition circuit in the determination processing, and
   wherein the determination circuit is configured to invalidate a detection result that does not correspond to the instruction input position determined through the determination processing among detection results obtained by the detection circuit.

2. The display device according to claim 1, wherein the color of the image is fixed.

3. The display device according to claim 2, wherein the image having the fixed color is a calibration image for associating the display color with the detection result obtained by the color sensor.

4. The display device according to claim 1, wherein
   the color of the image is changed depending on the instruction input, and
   the determination circuit is configured to perform the determination processing based on the color of the image before and after the change depending on the instruction input.

5. The display device according to claim 1, wherein a change pattern of the color of the image is different for each of a plurality of partial regions.

6. A touch detection system comprising: a display device including a display unit that displays an image and a touch detection circuit configured to detect an instruction input provided to a display surface of the display unit; and a pointing device that provides the instruction input to the display surface, wherein
   the touch detection circuit includes:
   a drive electrode,
   a touch detection electrode opposed to at least part of the drive electrode with a dielectric interposed therebetween, and
   a detection circuit configured to detect the instruction input based on a detection signal generated in the touch detection electrode in accordance with a drive signal applied to the drive electrode,
   the pointing device includes:
   a color sensor that detects a display color of the display surface at an instruction input position; and
   a transmission circuit configured to transmit information indicating the display color at the instruction input position detected by the color sensor, and
   the display device includes:
   an acquisition circuit configured to acquire the information indicating the display color transmitted by the transmission circuit; and
   a determination circuit configured to perform determination processing to determine the instruction input position based on the color of the image and the color indicated by the information acquired by the acquisition circuit,
   wherein the determination circuit is configured to collate a color of the image set to be different for each of a plurality of partial regions constituting a display region of the display unit with the color indicated by the information acquired by the acquisition circuit in the determination processing, and
   wherein the determination circuit is configured to invalidate a detection result that does not correspond to the instruction input position determined through the determination processing among detection results obtained by the detection circuit.

7. A display device comprising:
   a display unit that displays an image;
   a touch detection circuit configured to detect an instruction input provided by a pointing device to a display surface of the display unit;
   an acquisition circuit configured to acquire information indicating a display color at an instruction input position, the display color being detected by a color sensor included in the pointing device; and a determination circuit configured to perform determination processing to determine the instruction input position based on a color of the image and the color indicated by the information acquired by the acquisition circuit, wherein the color of the image is changed depending on the instruction input, and the determination circuit is configured to perform the determination processing based on the color of the image before and after the change depending on the instruction input.

8. The display device according to claim 7, wherein the determination circuit is configured to collate a color of the image set to be different for each of a plurality of partial regions constituting a display region of the display unit with the color indicated by the information acquired by the acquisition circuit in the determination processing.

9. The display device according to claim 7, wherein the touch detection circuit includes a drive electrode, a touch detection electrode opposed to at least part of the drive electrode with a dielectric interposed therebetween, and a detection circuit configured to detect the instruction input based on a detection signal generated in the touch detection electrode in accordance with a drive signal applied to the drive electrode, and the determination circuit is configured to invalidate a detection result that does not correspond to the instruction input position determined through the determination processing among detection results obtained by the detection circuit.

10. The display device according to claim 7, wherein the color of the image is fixed.

11. The display device according to claim 10, wherein the image having the fixed color is a calibration image for associating the display color with the detection result obtained by the color sensor.

12. The display device according to claim 7, wherein a change pattern of the color of the image is different for each of a plurality of partial regions.

* * * * *